(12) United States Patent
Reid et al.

(10) Patent No.: US 11,633,806 B1
(45) Date of Patent: Apr. 25, 2023

(54) METHOD TO FILL HEAT PIPE ARRAYS

(71) Applicant: Triad National Security, LLC, Los Alamos, NM (US)

(72) Inventors: Robert S. Reid, Los Alamos, NM (US); Morgan T. Biel, Los Alamos, NM (US); Nicholas M. Diskerud, Ann Arbor, MI (US); Lindsey M. Gaspar, Los Alamos, NM (US); Kyle B. Hammond, Los Alamos, NM (US); Martin Ward, Austin, TX (US)

(73) Assignee: TRIAD NATIONAL SECURITY, LLC, Los Alamos, NM (US)

( * ) Notice: Subject to any disclaimer, the term of this patent is extended or adjusted under 35 U.S.C. 154(b) by 123 days.

(21) Appl. No.: 17/076,706

(22) Filed: Oct. 21, 2020

Related U.S. Application Data

(60) Provisional application No. 62/924,206, filed on Oct. 22, 2019.

(51) Int. Cl.
| | |
|---|---|
| *B23K 26/12* | (2014.01) |
| *B23K 26/16* | (2006.01) |
| *B21D 53/06* | (2006.01) |
| *B23P 15/26* | (2006.01) |

(52) U.S. Cl.
CPC ............ *B23K 26/127* (2013.01); *B21D 53/06* (2013.01); *B23K 26/123* (2013.01); *B23K 26/16* (2013.01); *B23P 15/26* (2013.01); *Y10T 29/49353* (2015.01)

(58) Field of Classification Search
None
See application file for complete search history.

(56) References Cited

U.S. PATENT DOCUMENTS

| | | | | |
|---|---|---|---|---|
| 3,824,368 A | * | 7/1974 | Locke | ............ B23K 26/1423 |
| | | | | 219/121.33 |
| 2008/0029496 A1 | * | 2/2008 | Lin | ............ B23K 1/0056 |
| | | | | 219/121.64 |

FOREIGN PATENT DOCUMENTS

| | | | | |
|---|---|---|---|---|
| CN | 101995181 A | * | 3/2011 | |
| CN | 102735084 A | * | 10/2012 | ......... F28D 15/0283 |
| CN | 202657937 U | * | 1/2013 | |
| CN | 204787966 U | * | 11/2015 | |

OTHER PUBLICATIONS

Machine translation of CN 101995181 A, Sep. 2022 (Year: 2022).*
Machine translation of CN 102735084 A, Sep. 2022 (Year: 2022).*
Machine translation of CN 202657937 U, Sep. 2022 (Year: 2022).*
Machine translation of CN 204787966 U, Sep. 2022 (Year: 2022).*

\* cited by examiner

*Primary Examiner* — Geoffrey S Evans
(74) *Attorney, Agent, or Firm* — Alston & Bird LLP

(57) ABSTRACT

A fill tool system that fills, seals, and inspects a heat pipe array, which includes one or more heat pipes with heat pipe working fluid.

19 Claims, 29 Drawing Sheets

300

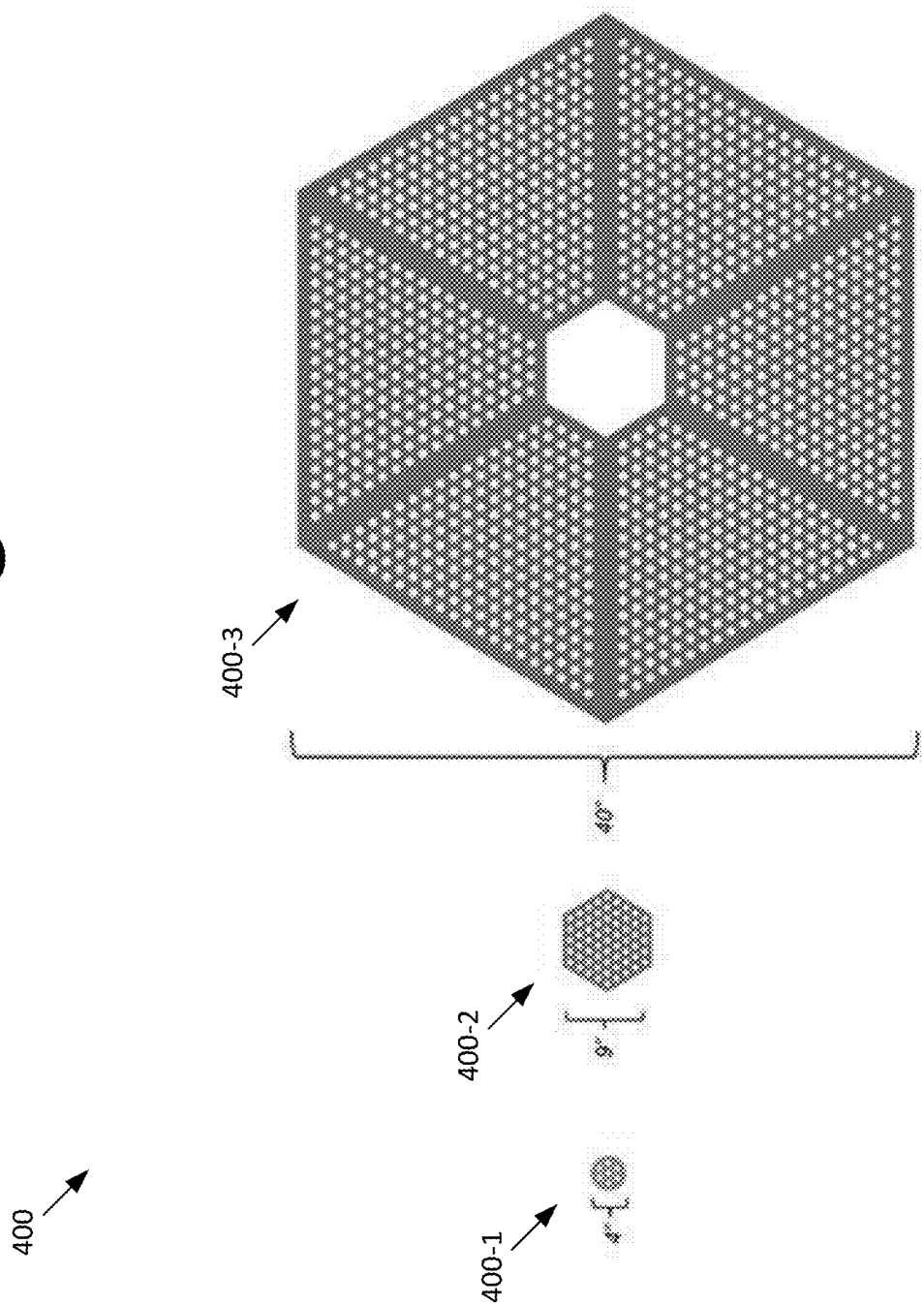

Legend
502 -- Inert Gas Port
504 -- Sodium Supply
505 -- Sodium Dip Leg
506 -- Sodium Supply Valve
508 -- Sodium Supply (or Metering) Manifold
510 -- Filter / Cold Trap
512 -- Shut Off Valve
514 -- Thermal Well
515 -- Thermal Well Vacuum Port
516 -- Flex Bellows
518A -- Upper Gate Valve for Isolation
518B -- Lower Gate Valve for Isolation
520 -- Viewport
522A -- Upper Rotatable Flange
522B -- Lower Rotatable Flange
522C -- Turntable
524 -- Sodium Tube
525 -- Thermal Well
526 -- Trace Heaters
529 -- Heat Pipe Cavities
528 -- Core Block (Stationary Monolith)
530 -- Connector – Flange -connects core block to fill system
532 -- Lifting Column
534 -- Sodium Process Assembly
536 -- Main Chamber Assembly
538 -- Upper Chamber
540 -- Lower Chamber
542 -- Laser Transmission Window Assembly
544 -- Laser Weld Window
546 -- Gas Knife Supply Port
548 -- Gas Knife Vacuum Port
550 -- Contracted Sodium Process Assembly
555 -- Extended Sodium Process Assembly
560 -- Leak Detector Port
562 -- Sniffer Nose
570 -- Vacuum Enclosure
580 -- Plug Sheet Guide
582 -- Plug Sheet

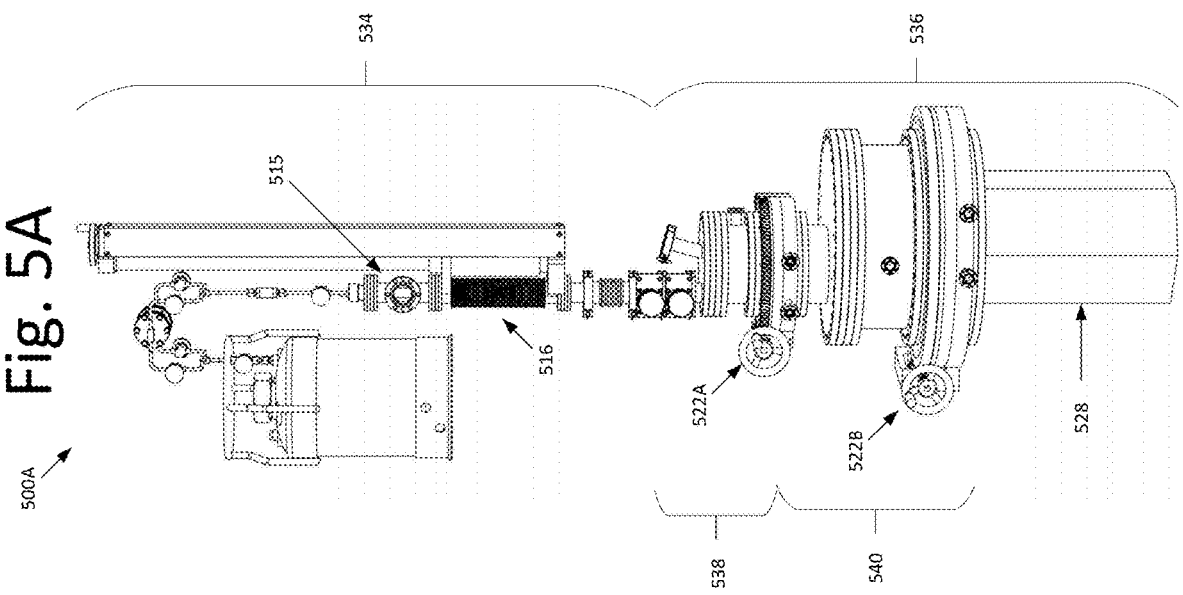

Fig. 5A

Fig. 5E
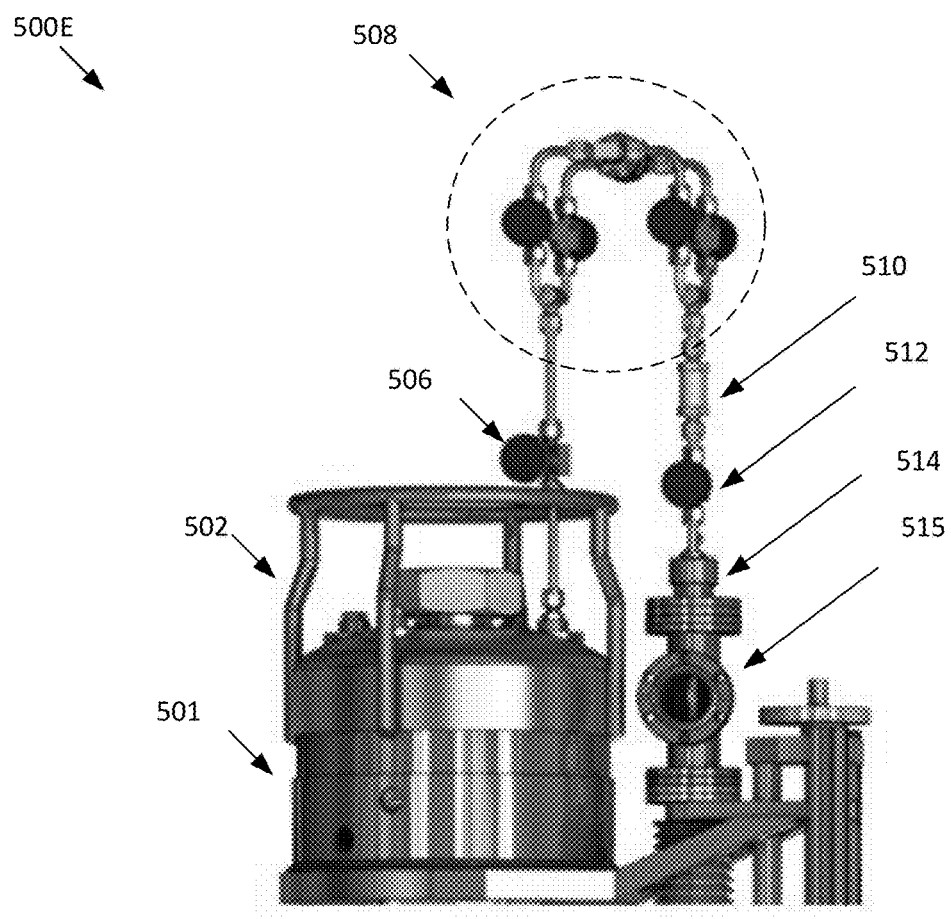
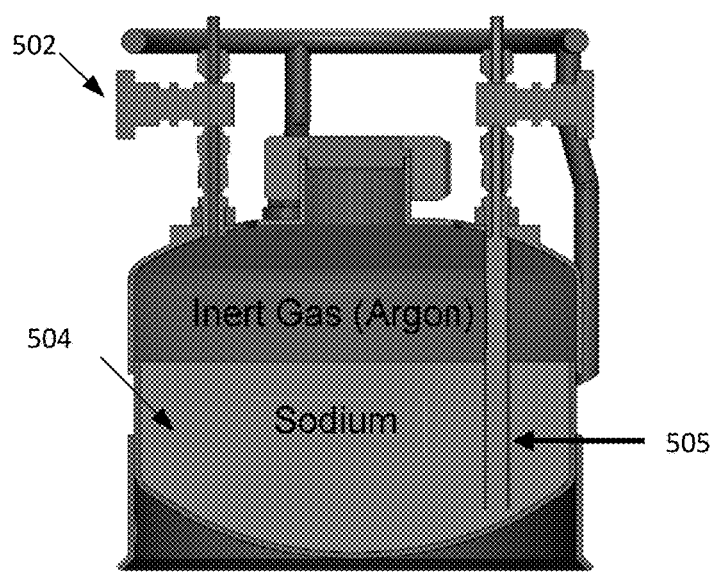

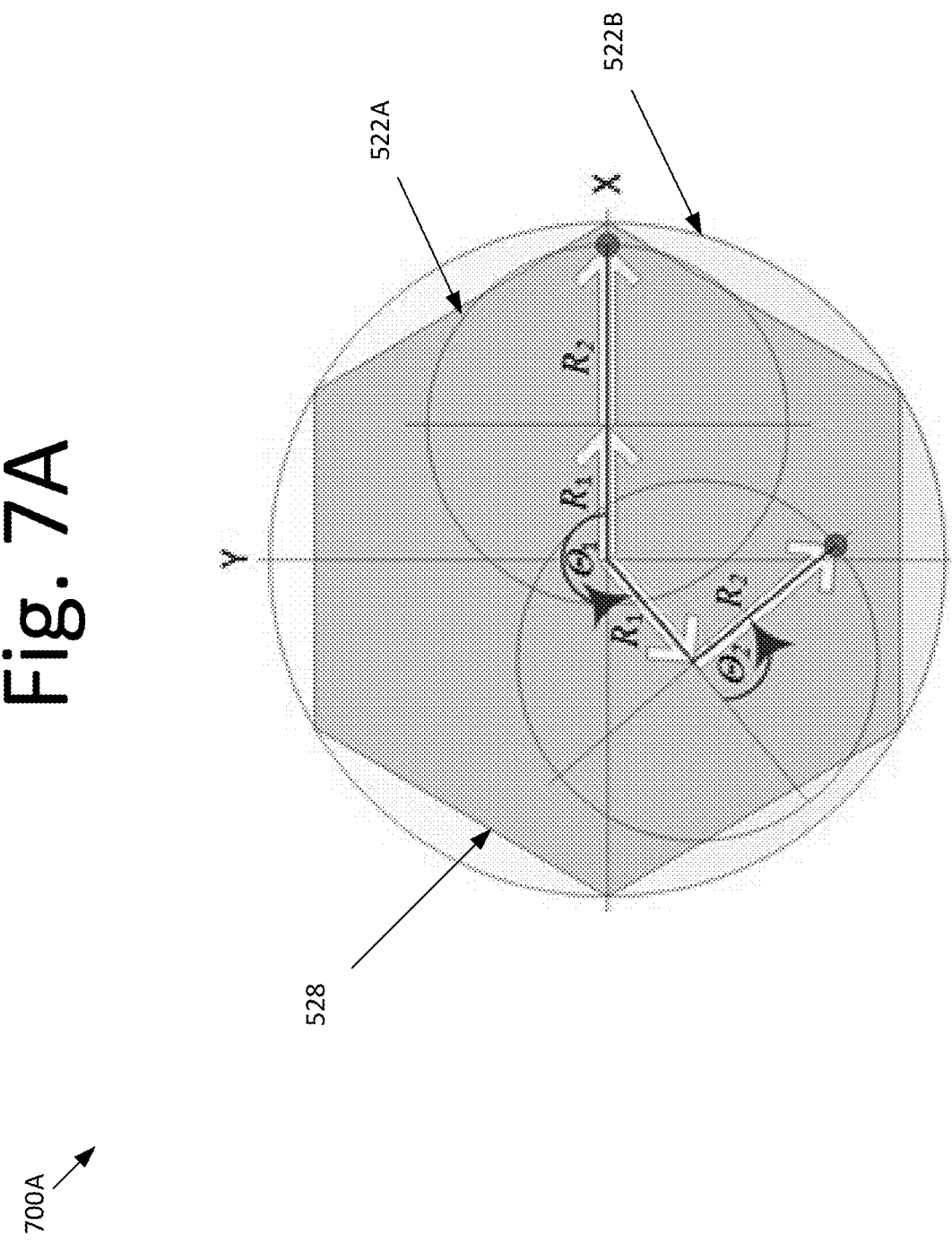

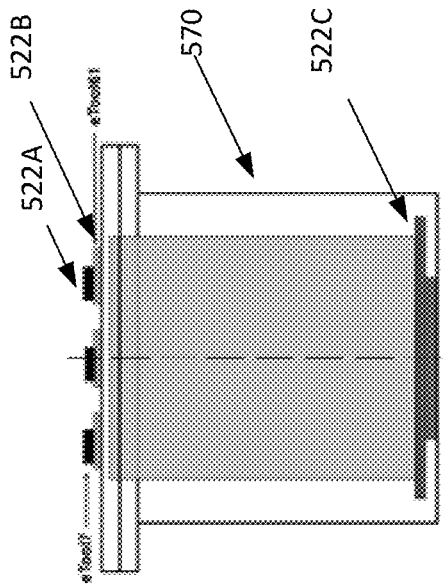
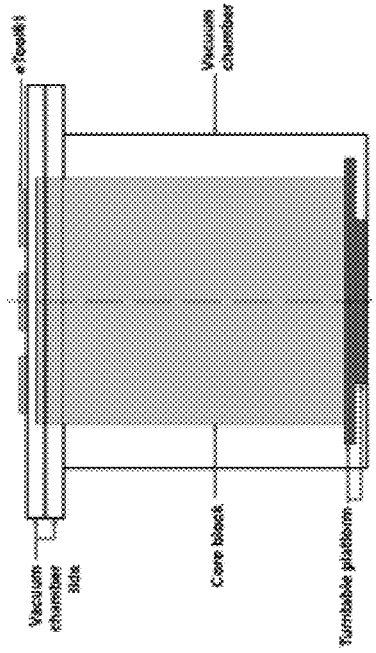
Fig. 7B

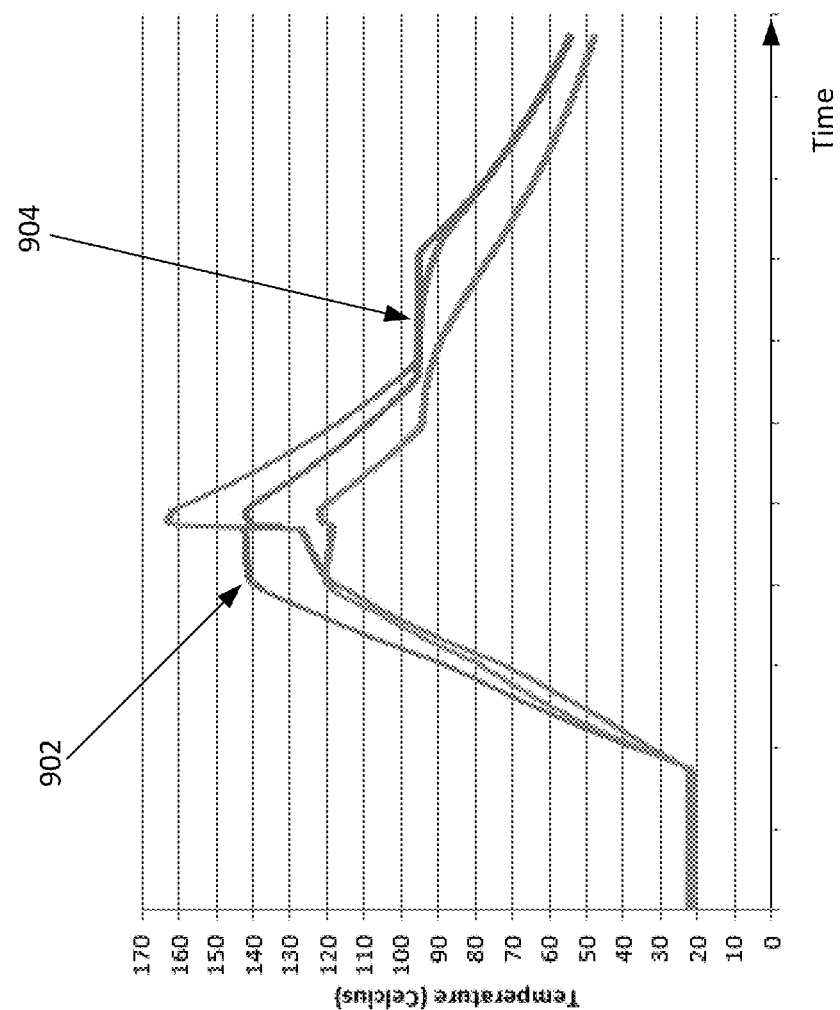

Fig. 12
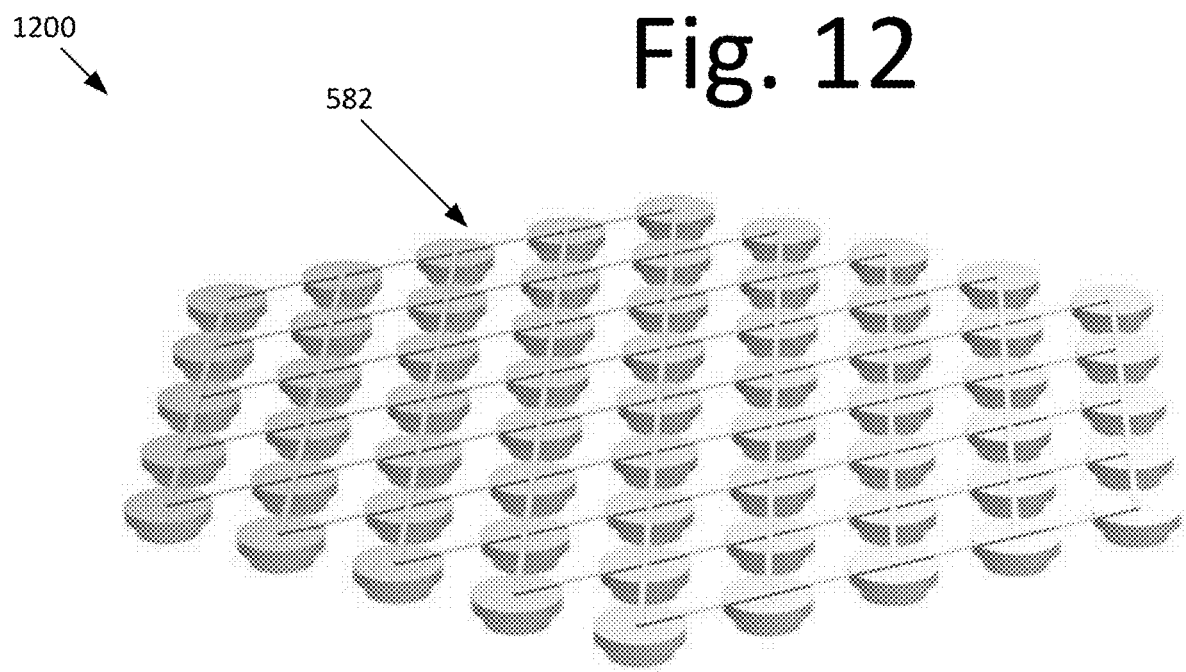
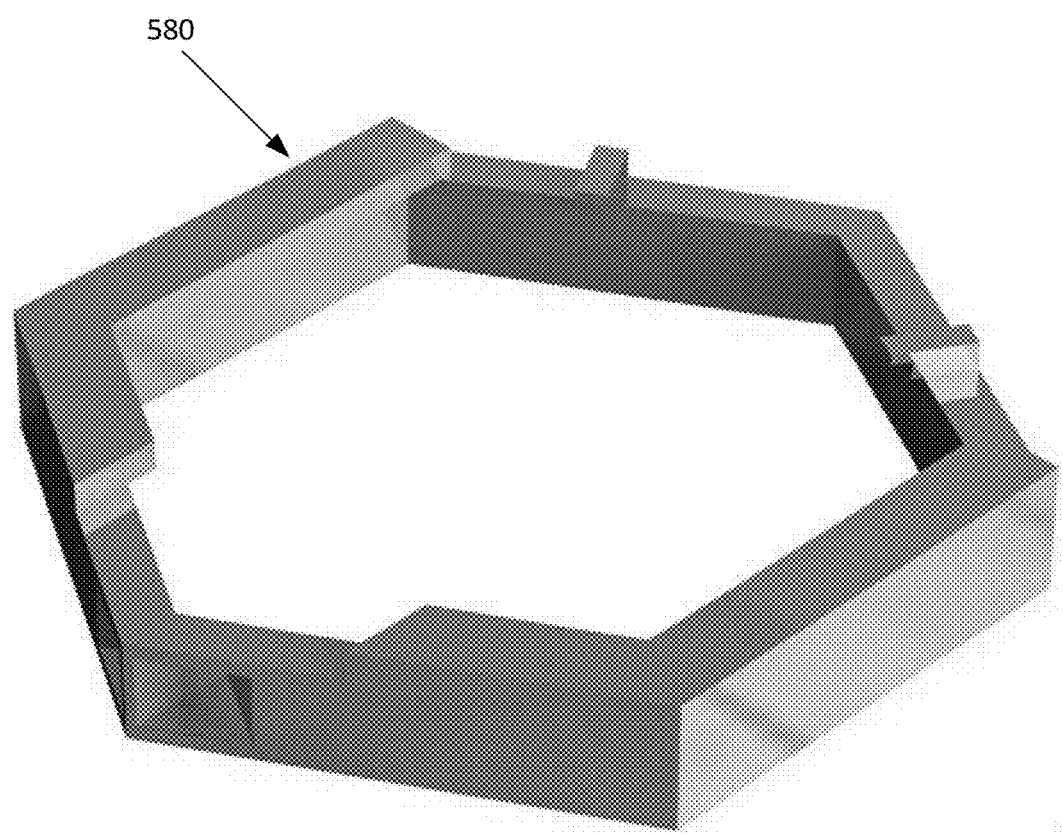

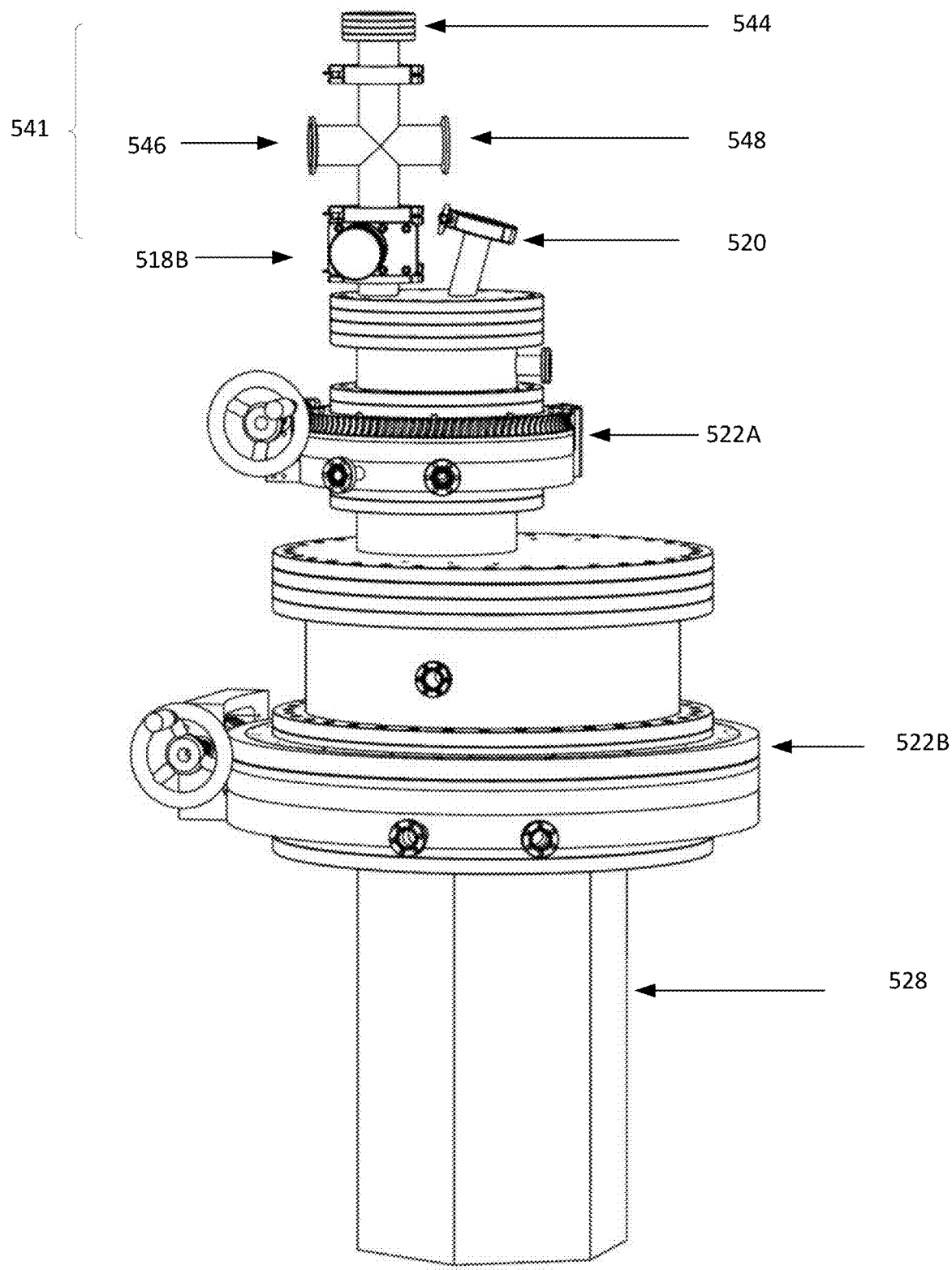

1500

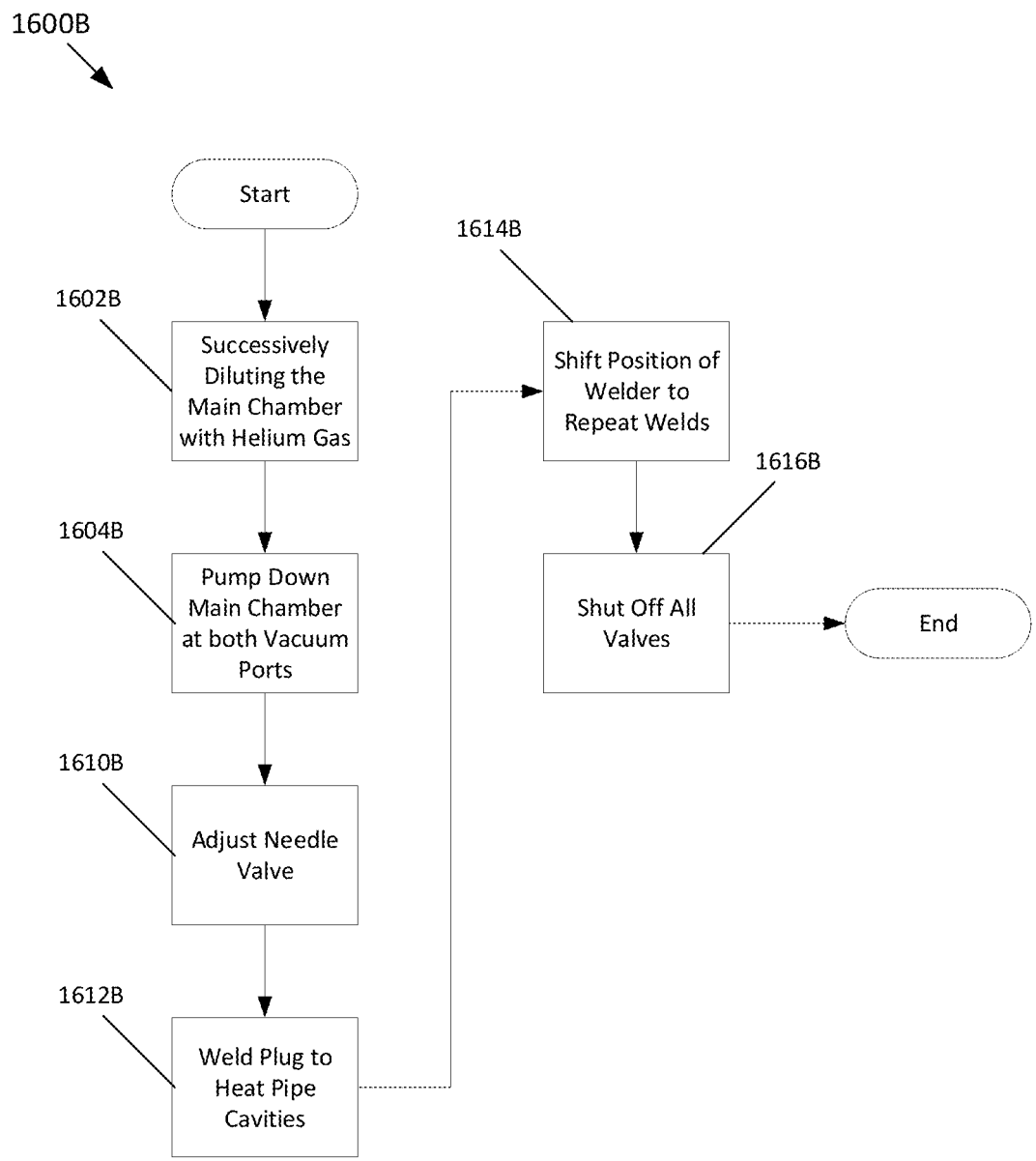

METHOD TO FILL HEAT PIPE ARRAYS

This application claims the benefit of U.S. Provisional Patent Application No. 62/924,206, filed on Oct. 22, 2019. The subject matter thereof is hereby incorporated herein by reference in its entirety.

STATEMENT OF FEDERAL RIGHTS

The United States government has rights in this invention pursuant to Contract No. 89233218CNA000001 between the United States Department of Energy and Trial National Security, LLC for the operation of Los Alamos National Laboratory.

FIELD

The present invention relates to heat pipe arrays and, more particularly, methods to fill heat pipe core arrays.

BACKGROUND

To date, low volume production of alkali metal heat pipes reflects their developing technology readiness level. In 2002, Los Alamos built a general-purpose alkali metal fill system for use at NASA Marshall Space Flight Center. This system allowed the fill of individual potassium, sodium, or lithium heat pipes in a low oxygen, water, and nitrogen inert gas environment (typically <1 ppm). FIG. 1 is an image 100 illustrating a general-purpose alkali metal fill system configured to fill sodium heat pipes for the SAFE-100a test program technology demonstration. Although this system was dependable with moderate flexibility and complexity, this system still required a skilled operator. Further, this system was designed to fill only a few individual heat pipe modules per day. While the fill system performed well for low volume development efforts, the system was ill suited for automated industrial fill of alkali metal heat pipe arrays. Recent interest in very small modular nuclear reactors motivates the development of a rapid and cost-effective fill system that fills and seals arrays of heat pipes with high purity alkali metal working fluid, such as sodium, in a mass production environment.

Thus, an alternative heat pipe reactor fill tool (the "fill tool") to address challenges associated with heat pipe manufacturing, e.g., those related to mass production, is needed.

SUMMARY

Certain embodiments of the present invention may provide solutions to the problems and needs in the art that have not yet been fully identified, appreciated, or solved by current heat pipe reactor core technology. For example, some embodiments generally pertain to a fill tool configured to sequentially fill and seal one or more alkali metal heat pipes.

In one embodiment, an apparatus includes a means to fill, seal, and inspect a reactor core heat pipe array, consisting of one or more heat pipes with a heat pipe working fluid.

In some embodiments, the fill tool system represents a significant departure from earlier approaches to working fluid fill. Some attributes for this fill system include rapid, reliable, inexpensive filling of a ~$10^3$-heat pipe monolith in several days or less. Simple and flexible filling steps intend to allow the fill system to be used by normally operators.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 4 is a diagram illustrating views of various reactor core block array configurations, according to embodiments of the present invention.

FIGS. 5A-5E are diagrams illustrating an exploded views of main chamber assembly, according to an embodiment of the present invention.

FIG. 7A is a diagram illustrating the two degree of freedom theta-theta positioning mechanism, according to an embodiment of the present invention.

FIG. 7B is a diagram illustrating elevation views of a multi-stage theta and theta-theta positioning mechanisms with turntable platforms, according to an embodiment of the present invention.

FIG. 9A is a diagram illustrating sodium line temperature controlled by trace heaters as a function of time during the melt and freeze associated with the fill configuration, according to an embodiment of the present invention.

FIG. 12 is a diagram illustrating a plug sheet and plug sheet guide mechanism, according to an embodiment of the present invention.

FIG. 14A is a diagram illustrating the eFill in the weld configuration, according to an embodiment of the present invention.

FIG. 16B is a process flow chart showing operating steps for the weld configuration without gas knife, according to an embodiment of the present invention.

DETAILED DESCRIPTION OF THE EMBODIMENTS

Figure 1:
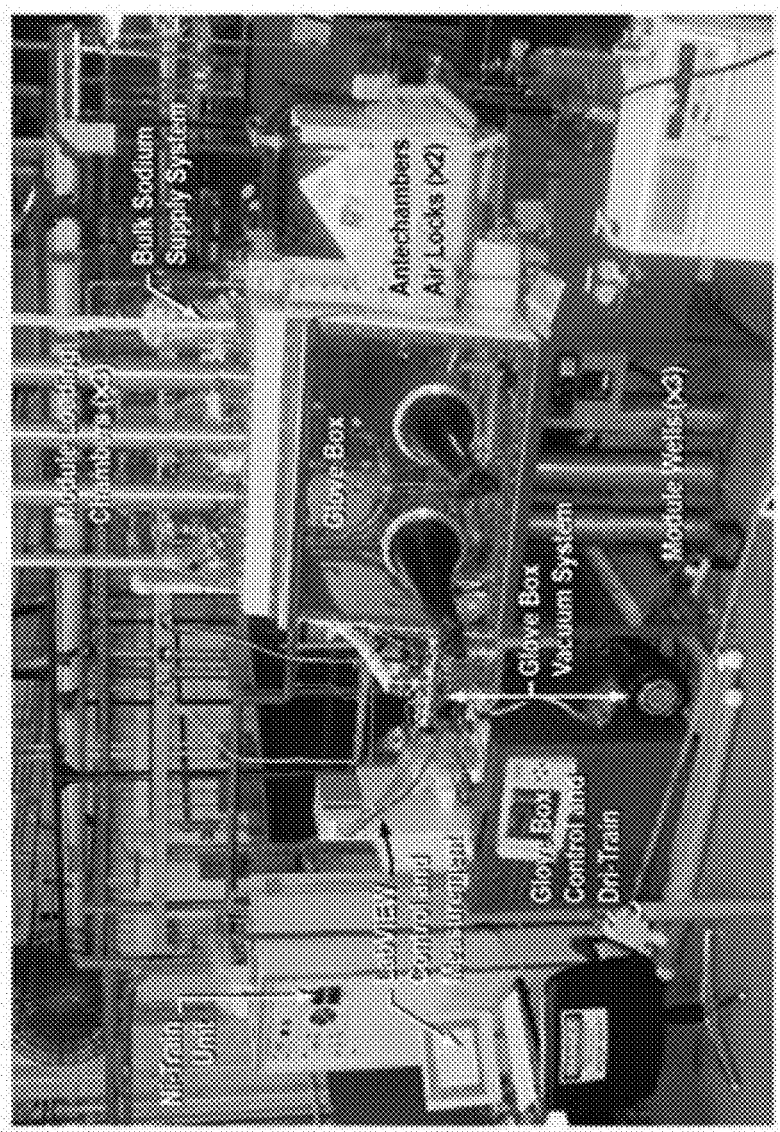
FIG. 1 is related art illustrating an image of a general-purpose alkali metal fill system configured to fill individual heat pipes for the SAFE-100a test program technology demonstration.

Some embodiments generally pertain to a fill tool configured to simultaneously fill and seal one or more heat pipes. In some embodiments, the fill tool is configured to fill an array of heat pipes, such as those found in a heat pipe micro reactor (the "reactor"). The array of heat pipes may be arranged in a circularly symmetric pattern, in some embodiments. The reactor may be in embodiments, a nuclear reactor.

Common to all embodiments is that working fluid is introduced into blind holes at the heat exchanger (condenser) end of the heat-pipe array. Although not limited to, discussed below are two possible fill tool embodiments, which may be referred to as eFill. In an embodiment, the fill tool (e.g., eFill7) may fill and seal a circular array of up to seven heat pipes. The scale model prototype demonstrates proof-of-principle operation of the fill and weld for a simple circular array of heat pipes. A single rotary platform produces the eFill7's horizontal motion. In another embodiment, the fill tool (e.g., eFill61) fills and seals an array of approximately 61 heat pipes on a generalized hexagonal pattern.

Regardless of the number of heat pipes, the fill tool (e.g., eFill) may operate in two distinct configurations—one for heat-pipe fill and the other for heat-pipe seal by laser welding. To enable reliable fill and to ensure safe laser welding operation, one or more embodiments may use vertical orientation of the core-heat exchanger assembly.

The fill tool may create a seal with the face of the reactor with the exposed heat pipe cavities. In some embodiments, the fill tool is an ultra-high-vacuum chamber equipped with an anti-chamber and laser transmission windows mounted on a rotatable flange. The fill tool may also include a linear motion actuator (the "actuator") located perpendicular to the face of the reactor and an inert gas port.

Within the anti-chamber is a manifold (the "working fluid process assembly"). The working fluid process assembly may lower over the heat pipe cavities and dispense working fluid into the heat pipes. Because the working fluid process assembly rotates via one or more rotatable flanges, the working fluid process assembly has access to all of the heat pipes in the array of heat pipes.

Once the heat pipes have been filled, a low pressure of helium is introduced into the system in some embodiments and an actuator slides a heat pipe plug sheet, allowing plugs to drop into their respective heat pipes. In other embodiments a dispenser inserts individual plugs into heat pipe cavities. Finally, a laser welder, residing outside of the chamber welds each plug in place through a laser transmission window located on the rotatable flange. The result is an array of heat pipes successfully filled and sealed with a small amount of helium trapped inside that permits weld inspection via helium leak detection.

It should be appreciated that there are multiple functions of the fill tool that can be described separately and functionally independent of one another. For example, these functions may include (1) the rotatable flange system, (2) the working fluid distribution system, (3) the heat pipe closure system, (4) the laser weld sealing operation, and (5) the weld inspection system. The description of each function is described in more detail below.

Rotatable Flange System

In some embodiments, one or more of the above-mentioned functions are bound by the requirement of scalability to be feasible for a mass production scale of in excess of 1000 heat pipes in a single array. To address this issue, the fill tool incorporates one or more ultra-high vacuum rotatable flange (the "flange").

In certain embodiments, the working fluid process assembly is retractable. For example, when the working fluid process assembly is not in use, the working fluid process assembly is housed in an anti-chamber for the purpose of controlling the environment. The working fluid process assembly and its surrounding anti-chamber may also be detached and serviced in a glove box.

Working Fluid Process Assembly

Heat Pipe Closure System

Once the heat pipes have been filled with working fluid, they may be sealed with plugs at the condenser end of heat pipe cavity.

In some embodiments, array closure is achieved with a heat pipe plug sheet (the "plug sheet"): a network or web of heat pipe plugs that are connected to each other by webbing. This plug sheet may hold the heat pipe plugs in the same pattern configuration as the heat pipes. The plug sheet can be translated horizontally via a linear motion actuator fed through a vacuum port in the chamber such that the plugs drop into their respective holes. The plugs and or the webbing may be embedded with magnets to assist the positioning of the plugs. The shoulder of each plug creates an interface with the reactor face that can be welded into place. In some embodiments, the plugs rest on the face of the reactor offset from their respective holes such that the manifold can be lowered into the heat pipes through the gaps in the plug sheet webbing.

In some embodiments, array closure is achieved with a heat pipe plug dispenser mechanism (the "plug dispenser"): a series of heat pipe plugs that are stacked in a tube with a mechanism to release an individual plug into a heat pipe cavity. The plugs are distributed to each heat pipe cavity by the rotatable flange system.

Laser Weld Sealing Operation

In some embodiments, a laser welder located outside of the chamber welds the plugs to the reactor face to seal each heat pipe after the plugs have been installed. The laser passes through the laser transmission window and into the chamber to complete the weld. Laser welding through the laser transmission windows and into vacuum chambers has been done in industry and is useful for maintaining a clean weld, as well as optimizing the weld penetration of the laser. The fill tool takes advantage of both of these benefits as the process must be clean and at low pressure.

It should be noted that the laser welder has a secondary function utilized after the heat pipes have been sealed. Using shield gas pressure, the laser welder may sever the webbing of the plug sheet, connects the plugs to each other, to finalize the process.

Weld Inspection System

After the heat pipes are filled and before the plugs are moved into place to be welded, helium gas is introduced into the chamber at a predefined pressure. The predefined pressure is such that even after sealed inside of the heat pipe, the presence of the non-condensable gas will not affect the performance of the heat pipe negatively. The helium, once sealed inside of each heat pipe, may leak out of any void or imperfections of the laser weld. Inspection allows detection and correction of such defects.

A helium leak detector may detect the leak during post weld inspection. This helium gas may also change the effective length of the heat pipe, which in turn can help to stabilize the reactor should one or more heat pipes fail.

Fill Tool Configurations

Figure 2:
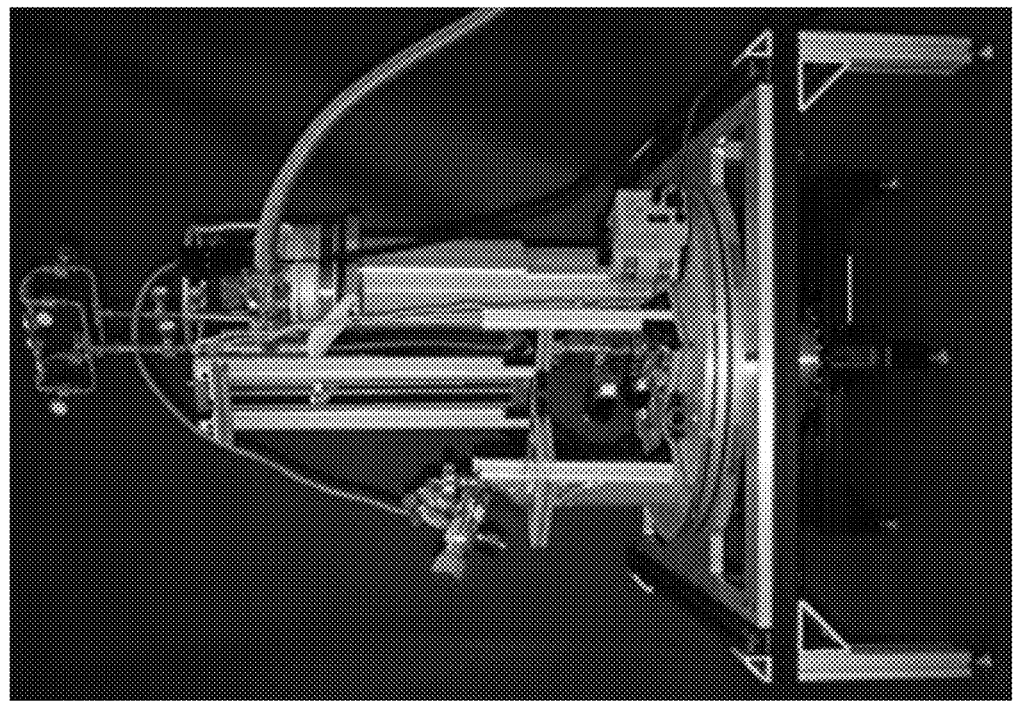
FIG. 2 is an image of a single degree of freedom fill system in a fill configuration, according to an embodiment of the present invention.
Figure 3:
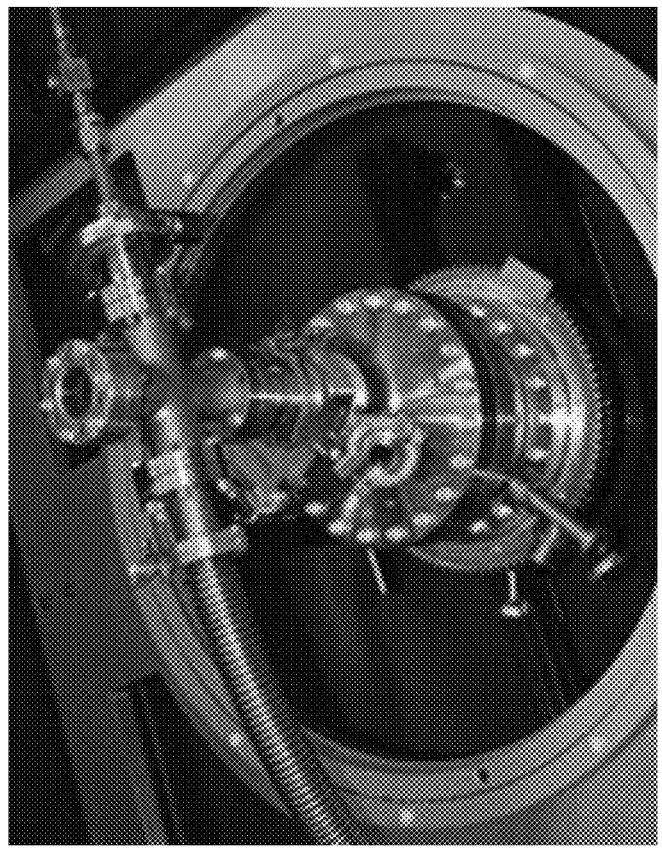
FIG. 3 is an image of a single degree of freedom fill system in a weld configuration, according to an embodiment of the present invention.

FIG. 2 and FIG. 3 are images 200, 300 of the weld and fill configurations of a prototype of this invention respectively, according to an embodiment of the present invention. This prototype which may be called the eFill7 is a single degree of freedom system which rotates about a single axis allowing a heat pipe array to be addressed from a fixed location about a rotational axis. This system transfers working fluid to a circular array of six heat pipes and seals the heat pipe array by laser welding. Though similar in concept to the rotary motion used to access heat pipes with the eFill7, another embodiment of the fill tool that may be referred to as eFill 61 has slightly more complex positioning requirements due to heat pipes being located at multiple radial distance from the center of the monolith. The eFill61 uses two rotating platforms to access heat pipes located at various radial distances. Fill is the first configuration used in the heat pipe production process. The eFill7 fills only the outer six heat pipes of the seven-heat pipe monolith, leaving the central heat pipe unfilled. This stems from the use of a single rotary platform that provides a single degree of freedom. This allows access to only heat pipes at a single radial distance from the center of the monolith.

The eFill system may be modular and may be scaled to unlimited size. Dependent on the embodiments, various sized monolithic block heat-pipe arrays may be used. For example, FIG. 4 is a diagram illustrating various monolithic block heat-pipe arrays 400-1, 400-2, 400-3, according to an embodiment of the present invention.

FIGS. 5A-5E are diagrams illustrating an exploded views of main chamber assembly 500, according to an embodiment of the present invention. Main chamber assembly 536 may comprise a monolith (with exposed heat-pipe cavities) 528, rotary platform 522B, lower chamber 540 and upper chamber 538.

Figure 5B:
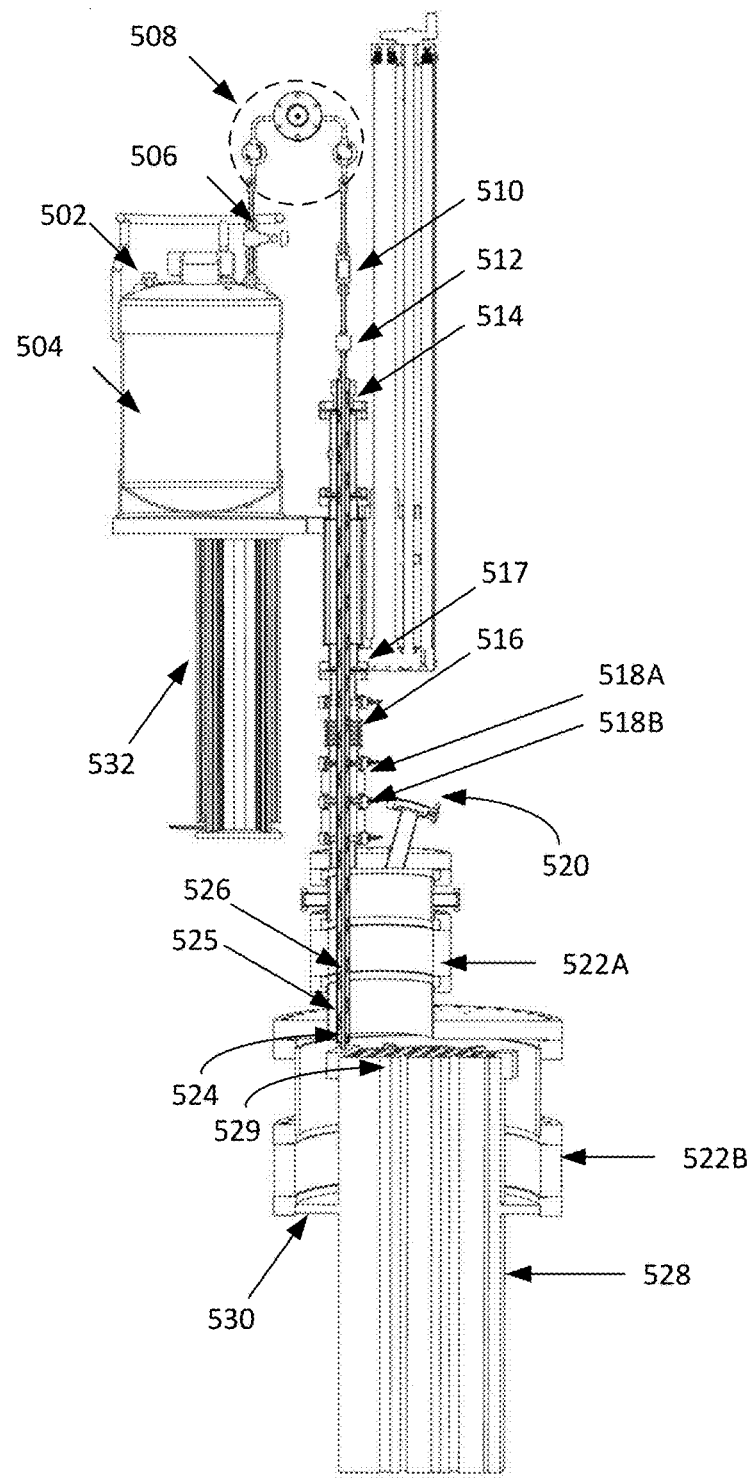

FIGS. 5A and 5B are diagrams illustrating a fill tool (e.g., eFill) system 500 configured to fill a heat array, according to an embodiment of the present invention. eFill system 500A is designed to fill up to 61 heat pipes on a two dimensional plane, in certain embodiments. In an embodiment, the eFill system 500 includes working fluid process assembly 534 and main chamber assembly 536. Main chamber assembly 536 includes a stationary monolith (or core block) 528, upon which rests a lower rotatable flange 522B, and a lower (or main vacuum) chamber 540 that covers the heat-pipe cavities.

In an embodiment, working fluid assembly 534 is configured to sequentially or simultaneously fill the plurality of heat pipes with a known quantity of working fluid, and a main chamber assembly configured to isolate the working fluid from atmosphere surrounding eFill system 500, thereby providing a controlled atmosphere. The controlled atmosphere may be a vacuum or an inert gas.

Working fluid process assembly 534 sits on a plate above main chamber assembly 536. Two adjacent isolating vacuum-rated gate valves 518A and 518B separate main chamber assembly 536 from working fluid process assembly 534. The gate valve 518B isolates main chamber assembly 536, and the gate valve 518A isolates working fluid process assembly 534. A rotatable flange 522A may allow working fluid process assembly 534 to move with rotatable flange 522B positioning a working fluid tube 524 over the heat-pipe cavities. Vacuum isolation via gate valves 518A and 518B allow for hermetic (or vacuum) separation of working fluid process assembly 534 from main chamber assembly 536 and attachment of laser transmission assembly 541 (see FIGS. 14A and 14B) to main chamber assembly 536.

In certain embodiments, working fluid process assembly 534 includes a bellows that holds a working fluid tube 524 heated with trace heaters 526 inside of thermal well 525. See FIG. 5B. As shown in FIG. 5B, a lifting column 532 extends and retracts working fluid process assembly 534, raising and lowering working fluid tube 524 into heat-pipe cavities 529, which are part of core block 528. See FIG. 5D. When lifting column 532 is completely extended, working fluid tube 524 and thermal well 525 reside in flex bellows 516. In this position, gate valve 518A may isolate working fluid tube 524 and thermal well 525, permitting the separation. See FIG. 5C. Opening both valves 518A and 518B allows for working fluid tube 524 and thermal well 525 to enter main chamber assembly 536. Working fluid tube 524 and thermal well 525 moves into main chamber assembly 536 by retracting lifting column 532. Raising lifting column 532 to withdraw the working fluid tube 524 above gate valves 518A may allow for gate valve 518A closure and vacuum isolation of the working fluid process assembly 534 from main chamber assembly 536.

Referring to FIG. 5B, a cross-section of eFill system in its extended (and retracted) position. After positioning the lower gate valve 518B and fill stem (or working fluid tube) 524 directly above a heat pipe, lifting column 532 lowers fill stem (or working fluid tube) 524 about ¼ in. into one of heat pipe cavities 529. This prevents the heat pipe working fluid from getting onto the surface of monolith 528. Once one of the heat pipe cavities 529 is filled with the heat pipe working fluid, lifting column 532 raises ½ in. away from the surface of monolith 528 to prepare for rotation of 522A and 522B to the next heat pipe cavity in the filling sequence. This process repeats until all heat pipe cavities 529 are filled.

Continuing with FIG. 5B, rotatable flanges 522A, 522B are stacked in some embodiments to extend the filling operation to an array of heat-pipe cavities arbitrarily positioned in radius and angle such as on a hexagonal pattern. See, for example, FIG. 4 or FIG. 7A. FIG. 7A, for example, is a diagram illustrating an rotatable flanges 522A, 522B, showing how the area is covered across the area of core block 528, according to an embodiment of the present invention.

Referring now to FIG. 5E, working fluid bearing lines use compression fittings to allow for design adjustment. Working fluid bearing lines may be composed of the following components: working fluid dip leg 505, working fluid supply valve 506, working fluid supply (or metering) manifold 508, filter and cold trap 510, shut off valve 512, thermal well 514, and working fluid tube 524. In another embodiments, orbital tube welded lines are incorporated to ensure vacuum integrity. The working fluid supply and all working fluid bearing lines may require trace heaters 526 and insulation heat working fluid bearing lines at temperatures greater than 160° C. Separate heater zones with temperature feedback control cover working fluid source 504, working fluid supply (or metering) manifold 508, filter/cold trap 510, and thermal well 514. Heater tape may cover valve bodies 506 and 512, but not valve handles, in certain embodiments. Exclusive use of all-metal bellows valves in working fluid transmission lines may avoid potential contamination from plastic seals.

Returning back to FIGS. 5B and 5E, during fill, argon passes through an inert gas port 502 and into free working fluid supply 504. The argon pressure forces working fluid up dip leg 505 towards a metering manifold 508. Metering manifold 508 meters working fluid into filter and cold trap 510. Filter and cold trap 510 purify the working fluid passing through it. Working fluid may then flow through a heated working fluid tube 524 contained inside a thermal well 525 where the working fluid enters main chamber assembly 536.

Figure 5C:
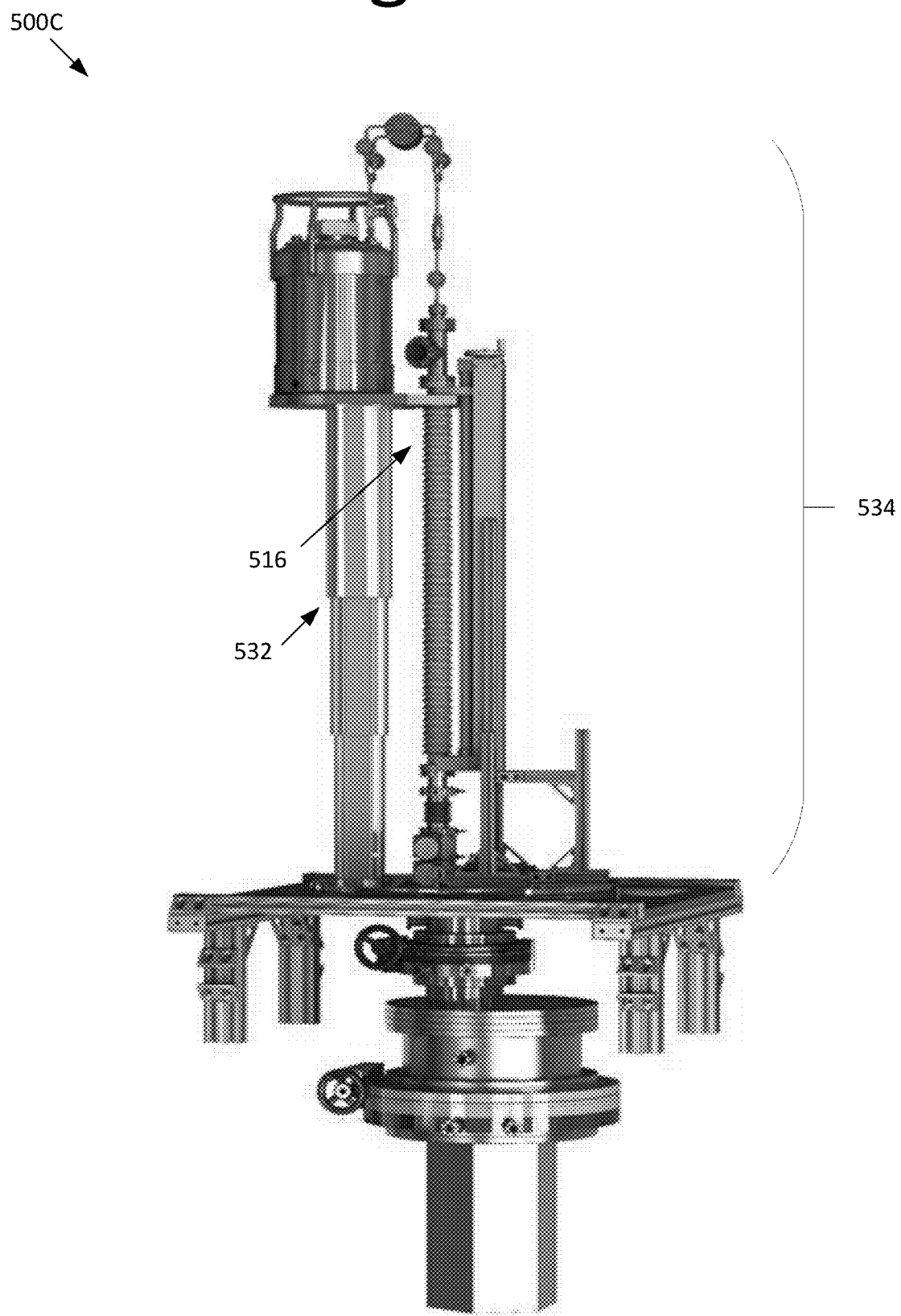

FIG. 5C is a diagram illustrating a perspective view of a two degree of freedom fill system in the fill configuration with a lifting column 532 in the extended position, according to an embodiment of the present invention. In this embodiment, lifting column 532 raises working fluid process assembly 534 contained in flex bellows 516 from the level of core block above gate valves allowing vacuum isolation of the working fluid process from surrounding air.

This embodiment allows for vertical motion for lifting and lowering working fluid process assembly 534 via lifting column 532.

Figure 5D:
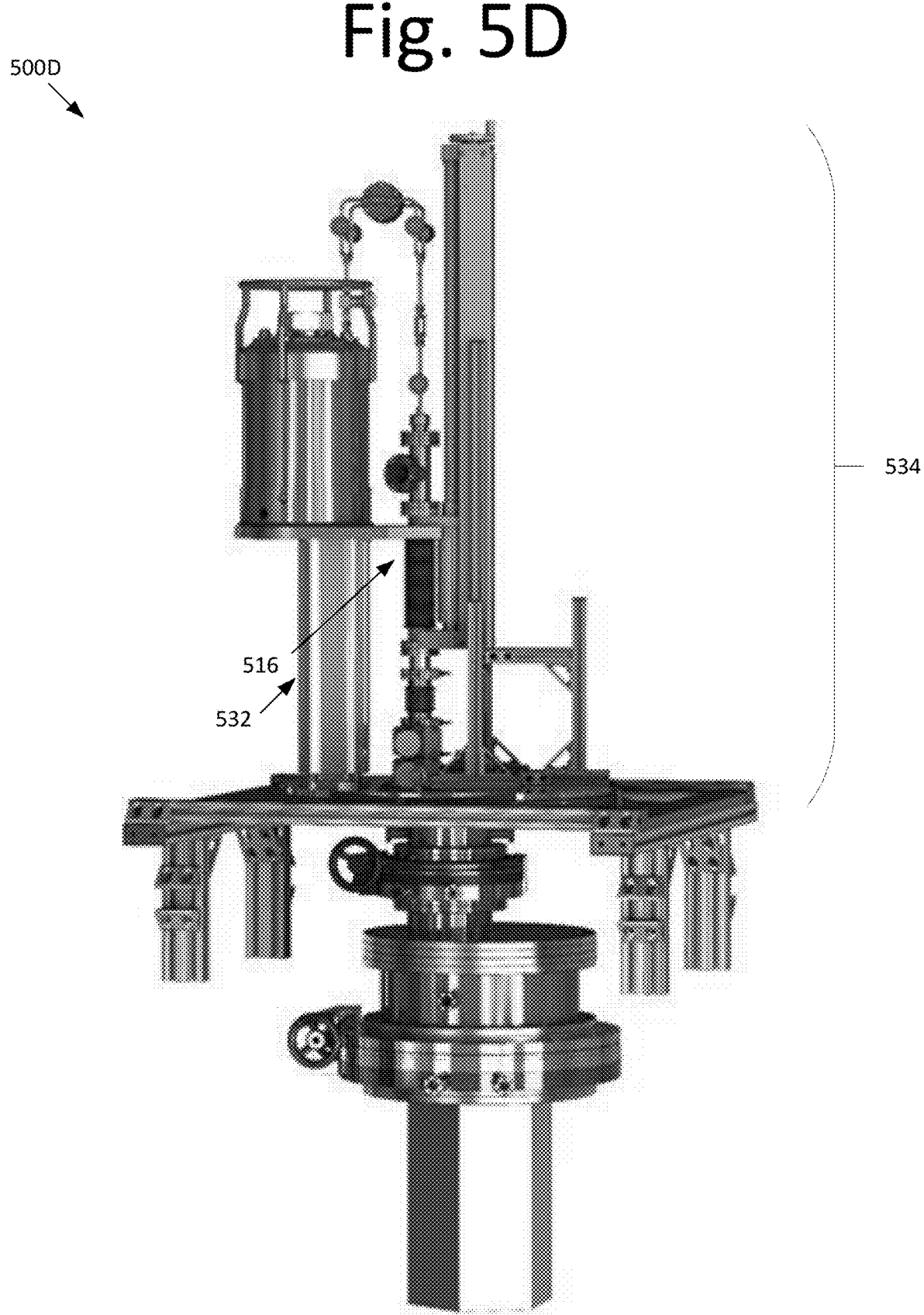

FIG. 5D is a diagram illustrating a perspective view of a two degree of freedom fill system in the fill configuration with a lifting column 532 in the retracted position, according to an embodiment of the present invention. In this embodiment, lifting column 532 lowers the working fluid process assembly 534 contained in bellows 516 from the level of the vacuum isolation valves to the level of the core block to allow working fluid to be dispensed into heat pipe cavities (not shown).

FIG. 5E are exterior and cut-away diagrams illustrating the upper fill assembly with working fluid supply 504, according to an embodiment of the present invention. The working fluid supply can 501 holds inert gas and (during operation) melted working fluid 504. Inert gas, such as argon or nitrogen, is applied to inert gas port 502. The pressure from the inert gas presses working fluid 504 up the working fluid dip leg 505 when working fluid supply valve 506 is opened. Working fluid passes through working fluid supply valve 506 to working fluid metering manifold 508 where a control quantity of working fluid is dispensed through 508 into filter/cold trap 510. When open, working fluid passes through shut off valve 512 into the thermal well 514.

Figure 6A:
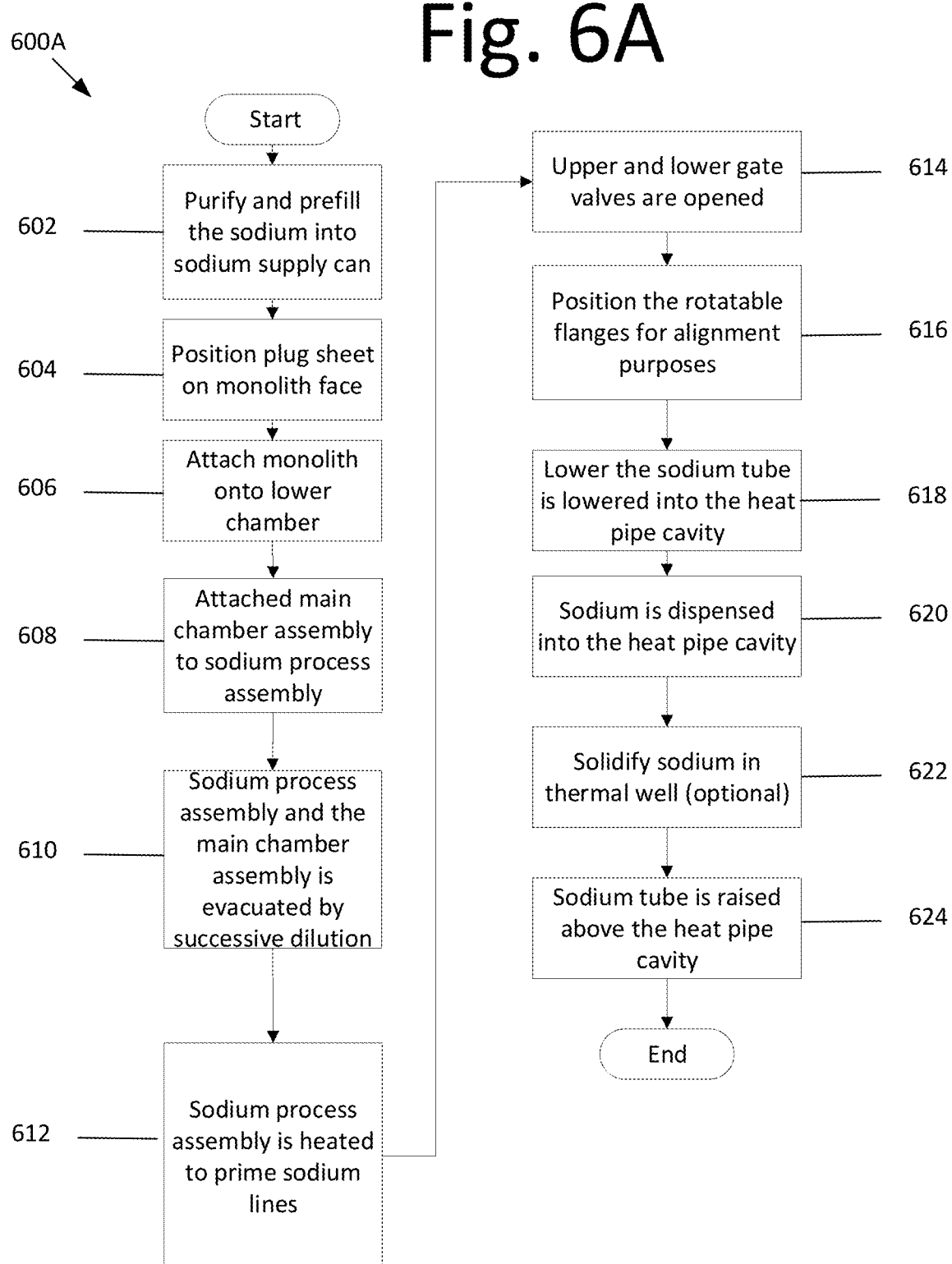
FIG. 6A is a process flow chart showing operating steps for fill, according to an embodiment of the present invention.

FIG. 6A is a flow diagram illustrating a process 600A for filling the heat pipe cavities, according to an embodiment of the present invention. In some embodiments, process 600 may begin at 602 with purifying and prefilling the working fluid into a working fluid supply can. If a plug sheet is used, it is positioned on the monolith face at 604. The monolith is then attached to the lower chamber at 606. At 608, the main chamber assembly is attached to the working fluid process assembly, and at 610, the working fluid process assembly and the main chamber assembly is evacuated by successive dilution with helium to 0.1 mbar pressure and then to $10^{-6}$ mbar. In other words, helium is added to the system to dilute the air in the system.

At 612, the working fluid process assembly is heated to a temperature at or above 110° C. to prime the working fluid process assembly lines with working fluid. At 614, the upper and lower gate values are opened to connect the working fluid process assembly to main chamber assembly. Then, at 616, the rotatable flanges are position to align the working fluid process assembly with the heat pipe cavity. Once aligned, then at 618, the working fluid tube is lowered into the heat pipe cavity. At 620, the working fluid is then dispensed into the heat pipe cavity through operating working fluid metering manifold. At 622, the working fluid may be solidified in the thermal well, in some embodiments. Finally, at 624, the working fluid tube is raised above the heat pipe cavity. This process may be repeated to fill the remaining heat pipe cavities.

Figure 6B:
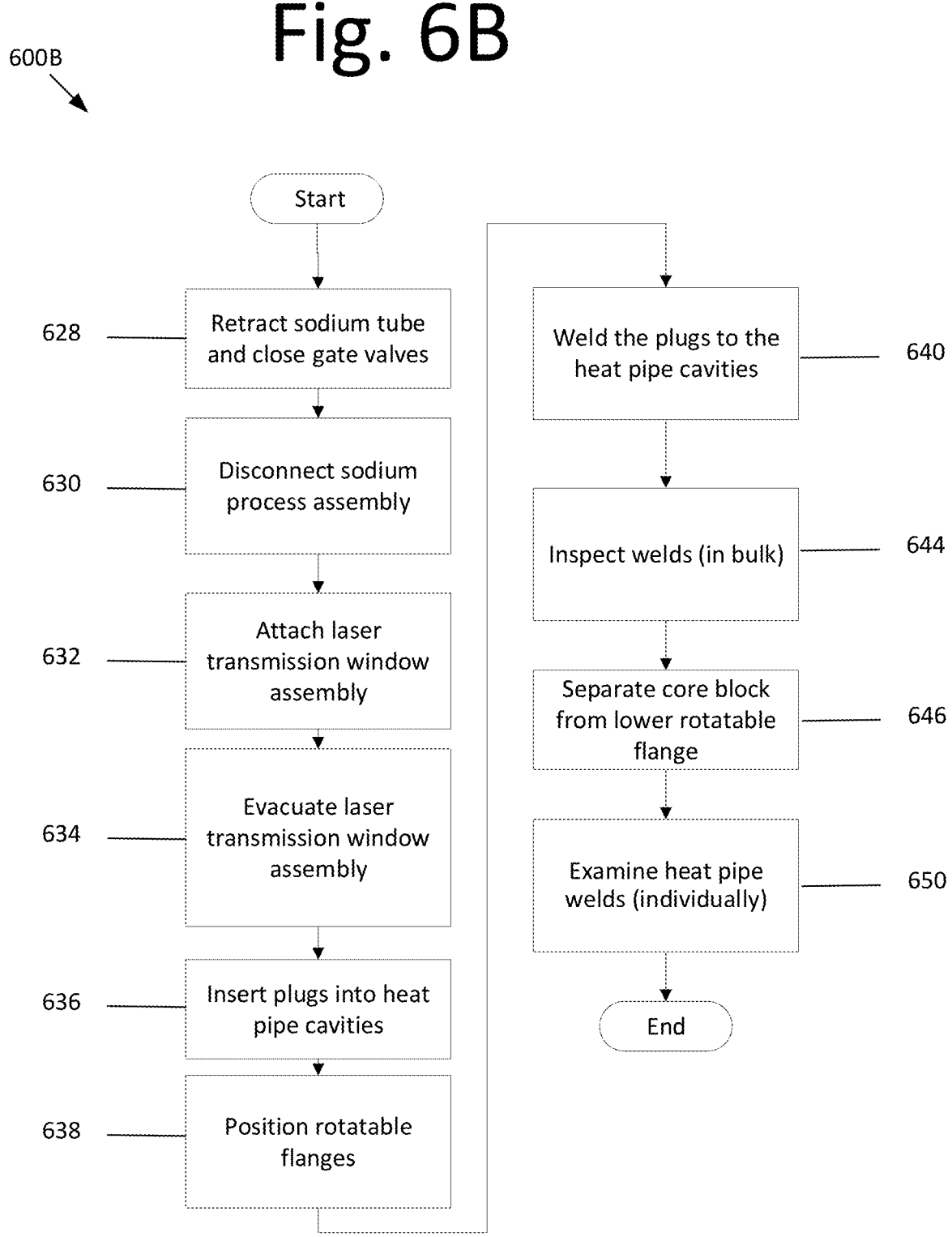
FIG. 6B is a process flow chart showing operating steps for weld closure, according to an embodiment of the present invention.

FIG. 6B is a flow diagram illustrating a process 600B for sealing the heat pipe cavities, according to an embodiment of the present invention. In some embodiments, process 600B may begin at 628 with retracting the working fluid tube into the working fluid process assembly and close the upper and lower gate valves. At 630, the working fluid process assembly is physically disconnected between the upper and lower gate valves, and the working fluid process assembly is kept under dynamic vacuum. This means that the dynamic vacuum continues to run at all times when the working fluid process assembly is disconnected from the main chamber assembly. At 632, the laser transmission window assembly is placed atop lower gate valve in preparation for laser welding. At 634, the laser transmission window assembly is evacuated to 0.1 mbar helium pressure by successive dilution. At 636, the plugs are then inserted into the heat pipe cavities.

Now, at 638, the rotatable flanges are positioned to align the laser transmission window assembly with heat pipe cavities. Then, at 640, the plugs are laser welded to heat pipes cavities while monitoring main chamber pressure with residual gas analyzer (RGA). Steps at 638 and 640 are repeated until all the plugs are laser welded to the heat pipe cavities.

At 644, bulk weld inspect is conducted by evacuating the main chamber assembly into a helium leak tester. At 646, the core block (or stationary monolith) is separated from lower rotatable flange. At 650, the individual heat pipe welds are examined with the inspection tool when necessary.

FIG. 7A is a schematic illustrating the two degree of freedom theta-theta mechanism 700A, according to an embodiment of the present invention. Core block 528 rests beneath one or more rotary flanges with motion represented by 522A for the upper rotatable flange and 522B for the lower rotatable flange. A trig relation describes the theta-theta position of the rotary platforms in Cartesian coordinates:

$$x = R_1\cos\theta_1 + R_2\cos\theta_2 \quad \text{Equation (1)}$$

$$y = R_1\sin\theta_1 + R_2\sin\theta_2 \quad \text{Equation (2)}$$

In the above equations, subscript 1 represents the motion of rotatable flange 522A and subscript 2 represents the motion of rotatable flange 522B.

The eFill concept may be further extended to larger core block. In those embodiments, a lower rotary platform may have multiple working fluid process assemblies, anti-chambers, as well as multiple laser transmission windows mounted on it. The upper rotary platforms can give the working fluid tubes and lasers access to any heat pipe cavity. Additionally, the core block may be placed on a turntable enclosed in a vacuum chamber. The rotary platform along with all other moving parts on the fill tool permit automation and closed loop feedback control.

FIG. 7B is a diagram 700B illustrating elevation views of one and two degree of freedom theta (upper rotatable flange) 522A and theta-theta mechanisms (lower rotatable flange) 522B with turntable platforms 522C, according to an embodiment of the present invention. Embodiments involving a larger eFill system makes use of a combination of primary and secondary rotatable flanges 522A and 522B and for very large systems, a tertiary turntable table 522C that moves the entire core block within a large vertical vacuum chamber 570. Further coverage over wider area can be obtained with multiple assemblies resting atop vacuum enclosure 570 that holds core block resting on turntable table 522C.

Figure 7C:
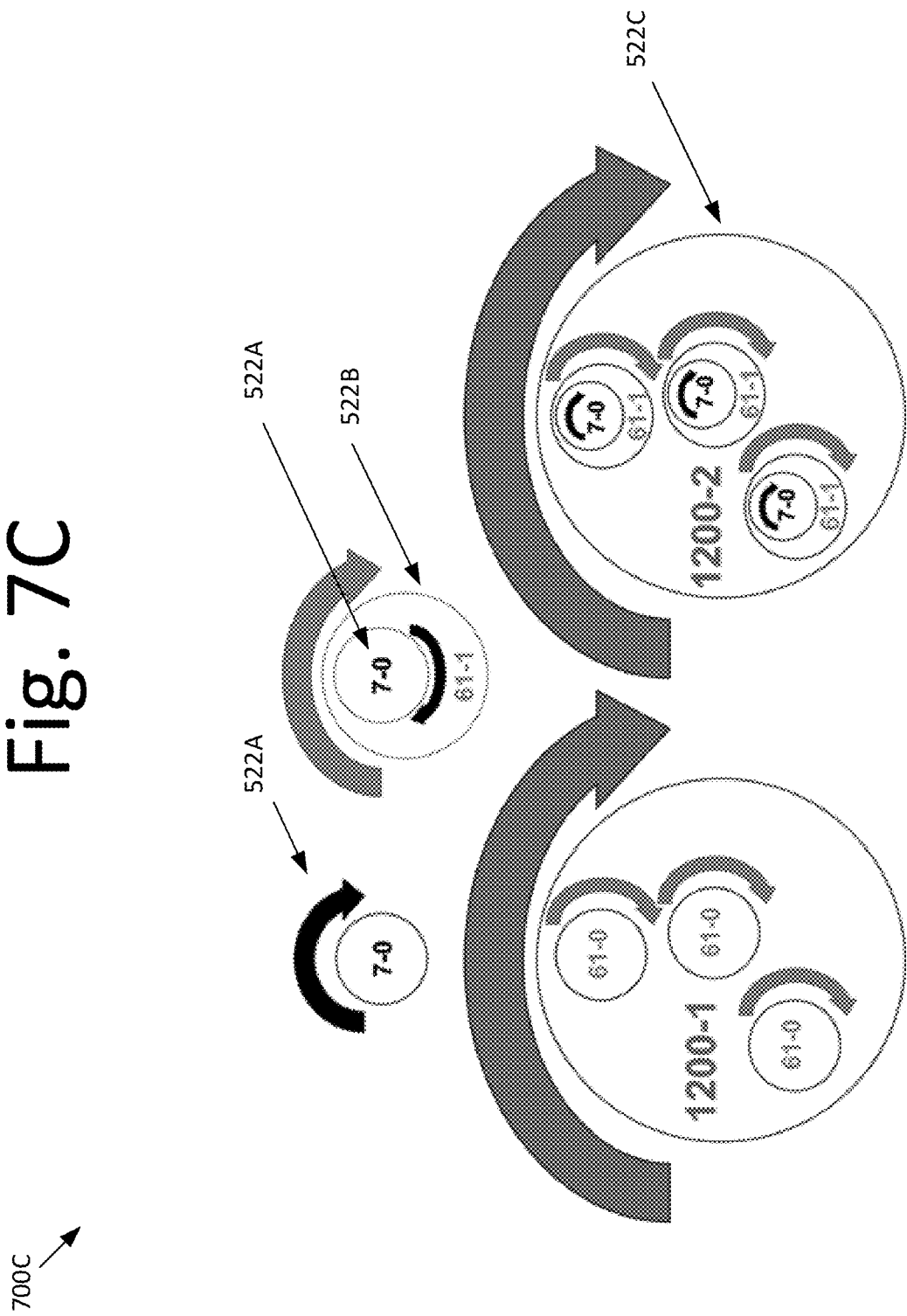
FIG. 7C is a diagram illustrating plan views of one and two degree of freedom theta and theta-theta mechanisms with turntable platforms, according to an embodiment of the present invention.

FIG. 7C is a diagram 700C illustrating plane views of one and two degree of freedom theta (upper rotatable flange) 522A and theta-theta mechanisms (lower rotatable flange) 522B with turntable platforms 522C, according to an embodiment of the present invention.

Figure 8:
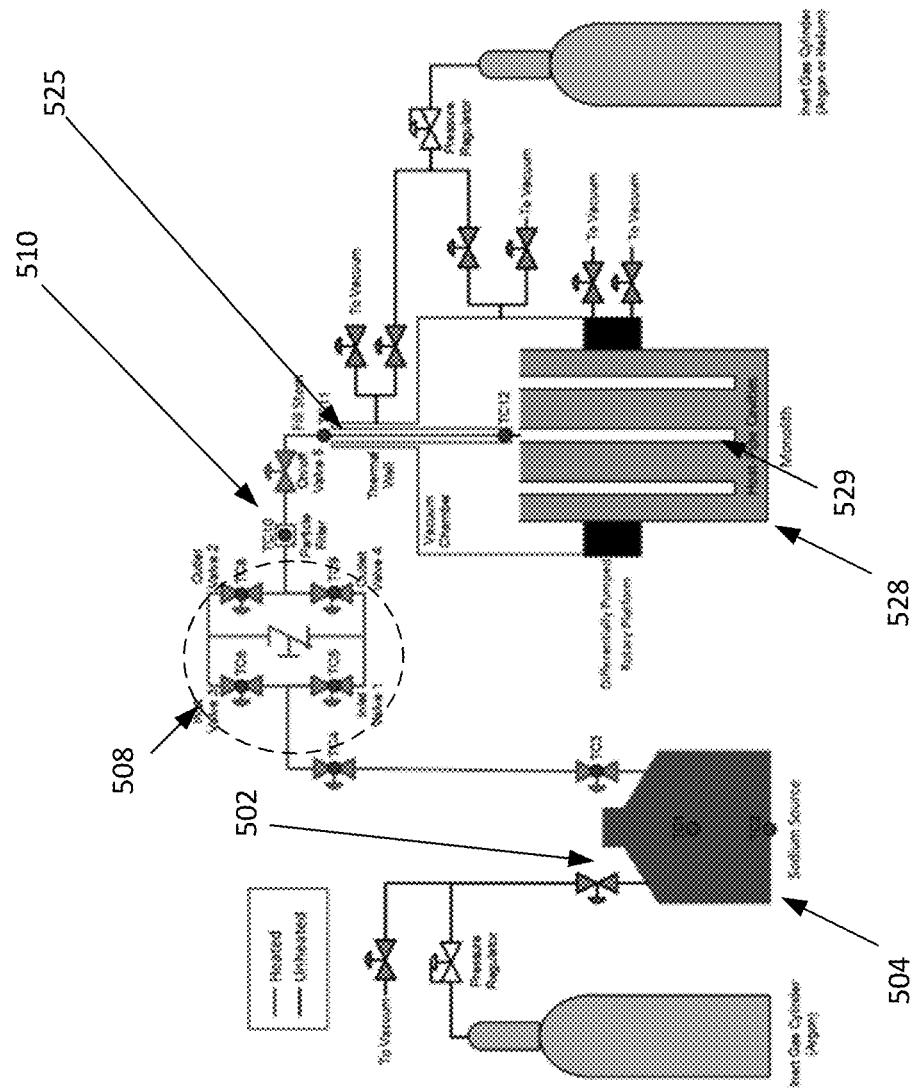
FIG. 8 is a diagram illustrating an elevation view of piping associated with the fill configuration, according to an embodiment of the present invention.

FIG. 8 is a diagram 800 illustrating an elevation view of piping associated with the eFill system, according to an embodiment of the present invention. Inert gas is supplied to working fluid source 504 through inert gas port 502. The gas pushes melted working fluid up the supply line to working fluid metering manifold 508. The working fluid then passes through filter (cold trap) 510 and down thermal well 525 where the working fluid is dispensed into heat pipe cavities 529. Throughout the heat-pipe fill, thermal management of the thermal process assembly ensures that working fluid is in its liquid phase during transfer.

Working fluid source 504 (including, for example, transfer lines, tees, and valves that make up the working fluid process assembly) must remain at a temperature at or above the melting temperature of working fluid. Heating elements such as flexible heaters, heater tapes, and heater cables (all of which are not explicitly shown) applied to external surfaces of the working fluid lines help achieve this end. Insulation applied to the heating elements and working fluid transfer lines reduce thermal loss and slow cooling rates when at low power. The location of the heated working fluid process assembly outside the vacuum chamber allows for versatile heater selection. In-chamber off gassing of hot components poses few concerns.

To control process temperature, thermocouples TC1 . . . TC12 mounted to transfer lines by spot welding should measure temperature at various points along the fluid travel path. Thermocouples TC1 and TC2 monitor working fluid source temperature and phase change of the initially solid working fluid. Thermocouples TC3 through TC9 monitor working fluid temperatures through travel lines and in the working fluid process assembly metering mechanism. Working fluid supply (or metering) manifold 508 represents a particularly sensitive component to cooling rate. If the piston cools rapidly, the thermal inertia of the sphere may cause a thermally induced interference fit. Plastic deformation of the piston may result, changing the calibration of the working fluid process assembly. Thermocouple TC10 measures working fluid temperature at the particle filter. Particle filter temperature is critical as it provides feedback regarding working fluid purity. Thermocouples TC11 and TC12 monitor thermal well entrance and exit temperatures respectively. Thermocouple TC12 is provides critical information regarding working fluid temperature and phase just before it enters the chamber. If temperature at thermocouple TC12 is not maintained sufficiently above the working fluid melt point, solidification could occur, preventing working fluid transfer. An inline particle filter also aids in impurity reduction.

FIG. 9A is a graph 900A illustrating sodium line temperature as a function of time during the melt and freeze associated with the fill configuration, according to an embodiment of the present invention. Trace heat is applied to the sodium source and to the lines spanning the sodium metering manifold and through the thermal well. During the sodium melt during start up, the temperature indicated on the outside of the lines may reach a level at state 902 above the sodium melt temperature. During the sodium freeze during shutdown, the indicated temperature on the outside of the lines may fall below the melt point of sodium as shown at state 904. A plateau corresponding to solidification is visible midway into the transfer process.

To prevent dripping onto the surface of the monolith face for the case of sodium, the thermal well may be cooled (<90° C.) between each heat pipe fill and prior to retraction of the fill stem. Temperatures in the sodium lines should otherwise remain above the melting point of sodium (98° C.) during sodium transfer operations.

Impurity Reduction

Non-metallic impurities, such as carbon and oxygen, can result in impurity-induced corrosion and inhibit wetting of working fluid to the wick and heat pipe wall during heat pipe operation. As a result, several techniques need to be employed to clean lines before priming and to purify the working fluid as it moves through the working fluid process assembly.

Figure 9B:
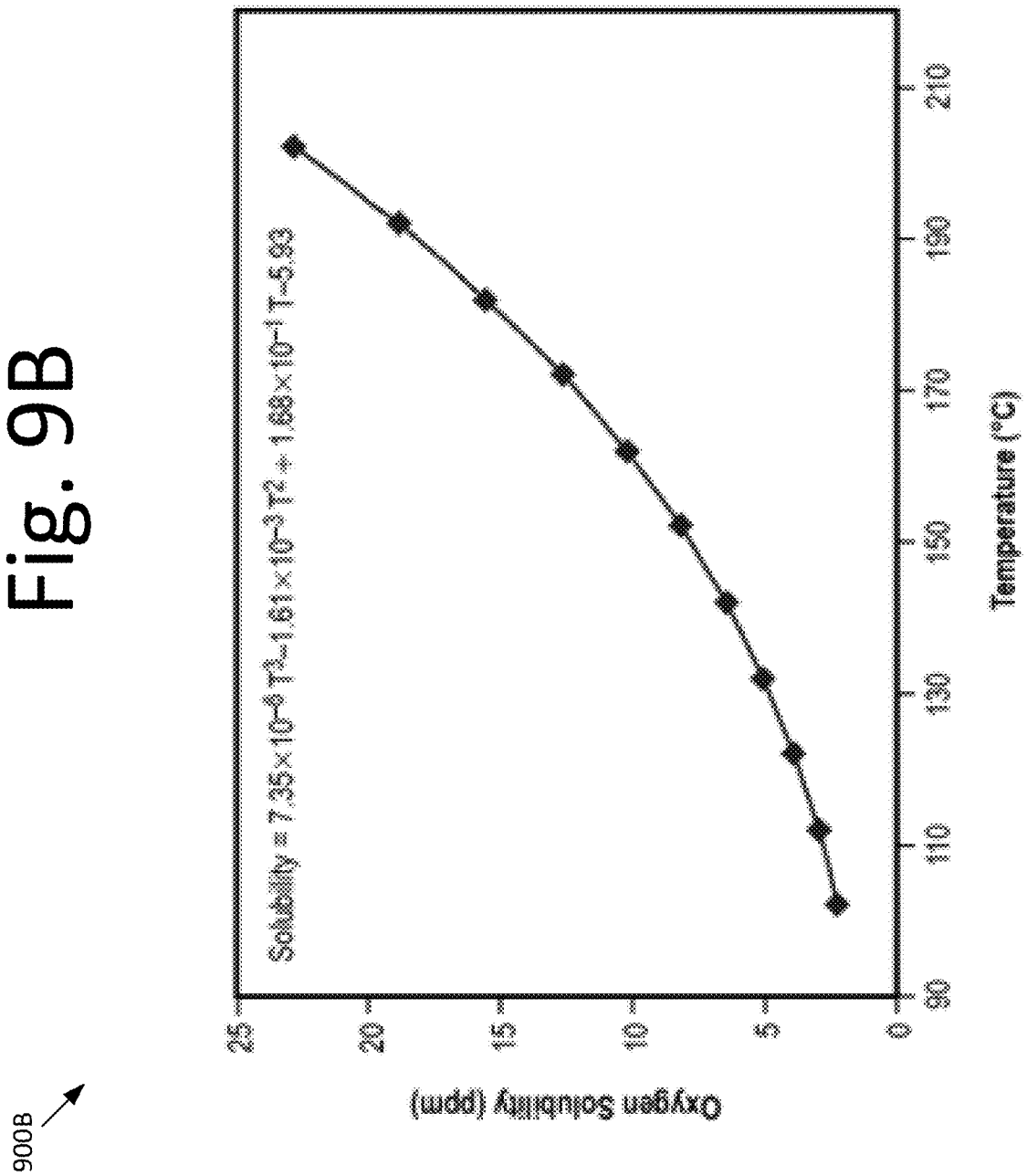
FIG. 9B is a diagram illustrating sodium oxygen solubility as a function of temperature, according to an embodiment of the present invention.

FIG. 9B is a graph 900B illustrating solubility of oxygen in sodium working fluid as a function of temperature, according to an embodiment of the present invention. Oxygen solubility in liquid sodium is a function of temperature. Similar relations may also hold for other non-metallic impurities that may contribute to corrosion. Graph 900B of FIG. 9B displays the relationship between oxygen solubility and sodium temperature, indicating that oxygen solubility increases exponentially with increased sodium temperature. An inline particle filter aids in impurity reduction by trapping precipitated sodium oxide onto the surface of the filter at low temperature.

Flow Control

Figure 10A:
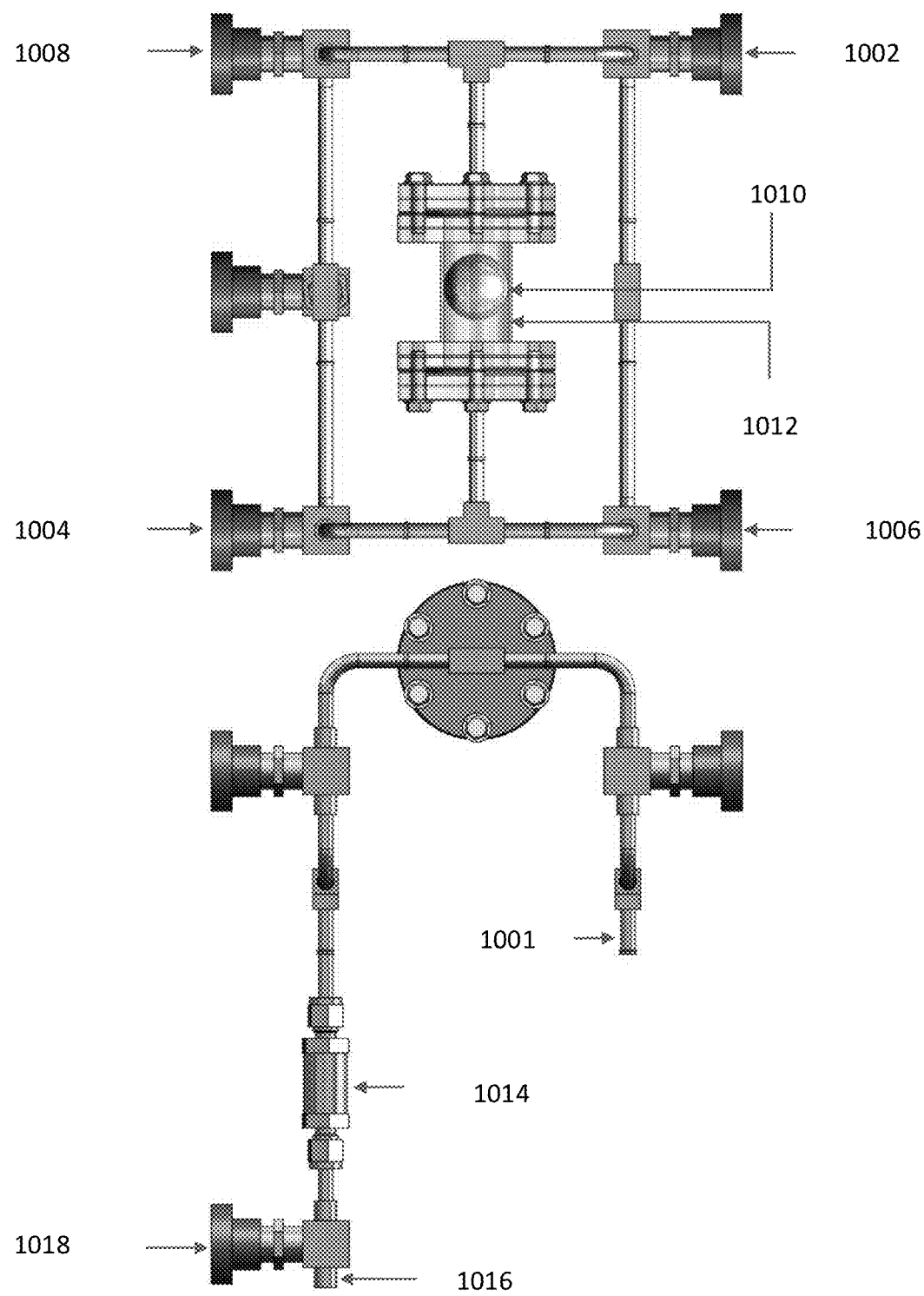
FIG. 10A is a diagram illustrating a dual acting spherical free piston used for precision dispensing of heat pipe working fluid in the neutral configuration, according to an embodiment of the present invention.
Figure 10B:
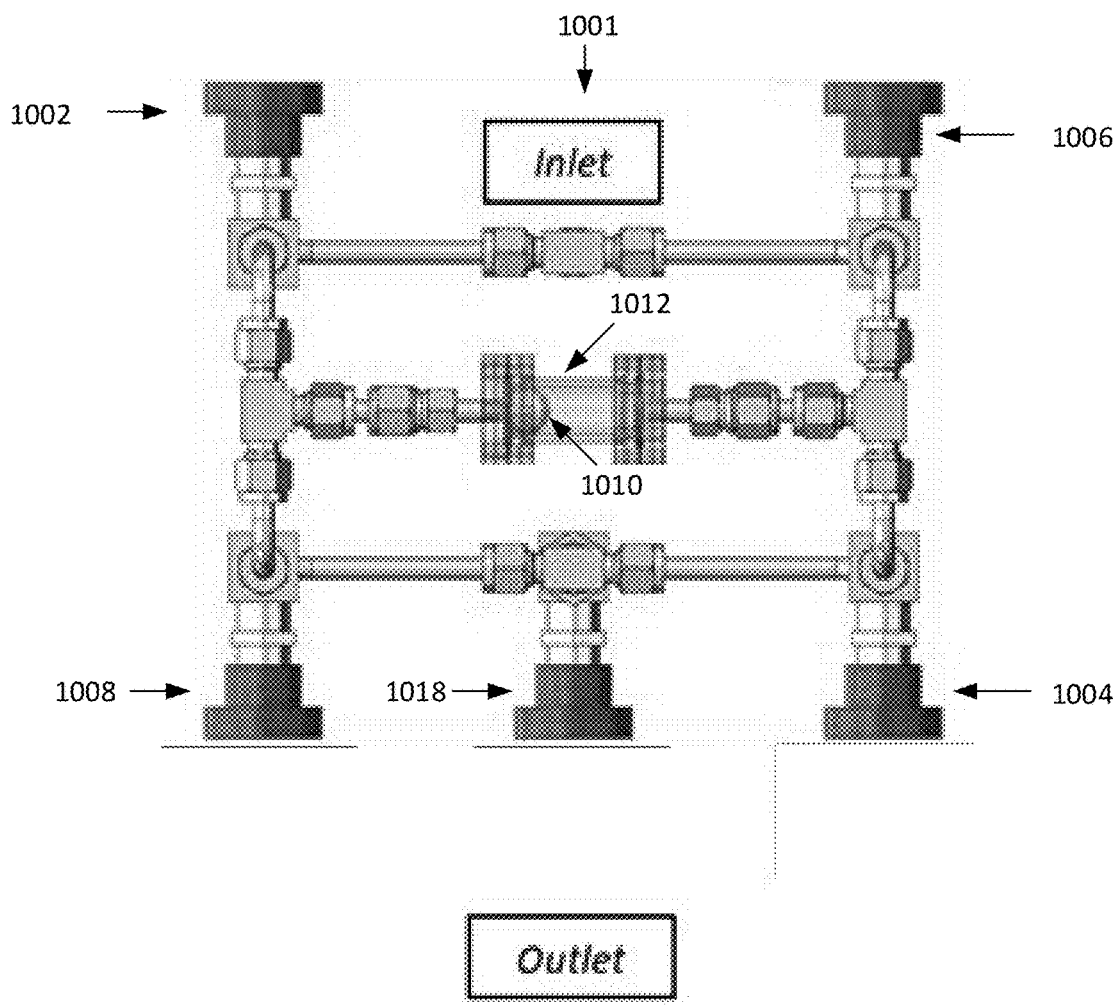
FIG. 10B is a diagram illustrating a dual acting spherical free piston used for precision dispensing of heat pipe working fluid in the initial configuration according to an embodiment of the present invention.
Figure 10C:
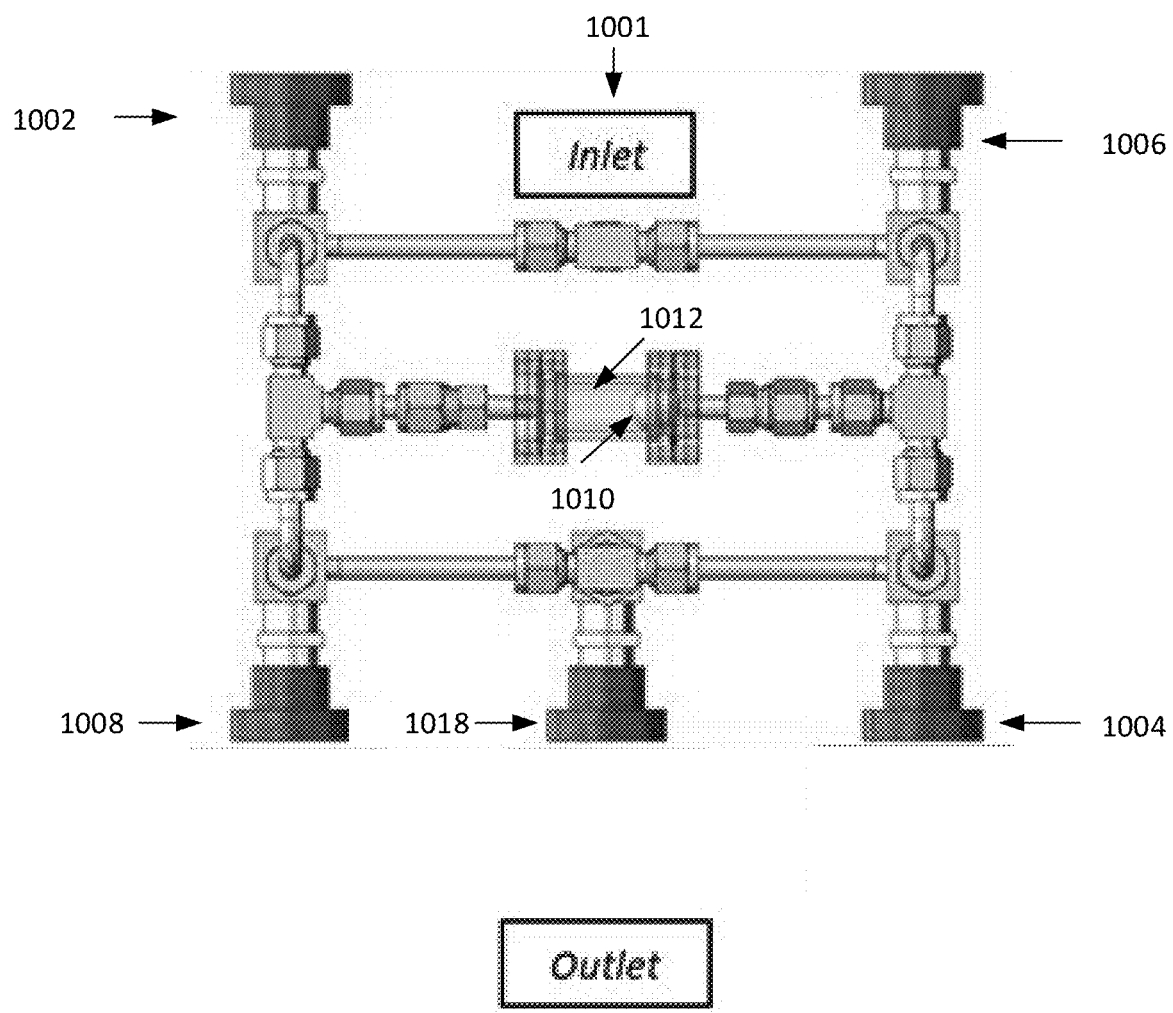
FIG. 10C is a diagram illustrating a dual acting spherical free piston used for precision dispensing of heat pipe working fluid at the conclusion of the initial stroke according to an embodiment of the present invention.

FIGS. 10A-10C are diagrams 1000A-1000C illustrating working fluid metering manifold in one or more positions, according to an embodiment of the present invention. The working fluid metering manifold is a dual acting spherical free piston used for precision dispensing of heat pipe working fluid. FIG. 10A shows the manifold in the neutral position with the ball 1010 in the middle of cylinder 1012. As shown in FIG. 10B, opening valves 1002 and 1004 in the working fluid process assembly moves working fluid from the inlet 1001 and pushes the ball 1010 across the cylinder 1012. Ahead of ball 1010 is a fixed quantity of working fluid that is pushed through valve 1004, where the working fluid passes out from metering manifold. In this embodiment, valves 1002 and 1004 are closed.

Moving to FIG. 10C, valves 1006 and 1008 in the working fluid process assembly are opened allowing working fluid to move from inlet 1001. Ball 1010 is then pushed across the cylinder 1012. Ahead of ball 1010 is a fixed quantity of working fluid that is pushed through valve 1008 where it passes out of the metering manifold. This achieves double action by allowing ball 1010 to translate in the selected direction along the length of cylinder 1012. The amount of fluid transferred per stroke may remain relatively constant due to translation of ball 1010 being limited to a stroke length equivalent to the length of cylinder 1012. This is especially true for translation in a single direction. Differences in diameter along the length of cylinder 1012, particularly at its ends, may however result in slightly larger variances between the amounts of fluid transferred in each stroke direction. Because strokes in a single direction produce consistent fluid quantity, the combination of a stroke in each direction produces a similarly consistent fluid quantity. The working fluid process assembly provides a controlled system of transferring working fluid from an external working fluid source, directly into each individual monolith heat-pipe cavity. This section addresses operation and repeatability of the working fluid process assembly as well as strategies essential for functionality.

Plug Sheet Positioning

Figure 11:
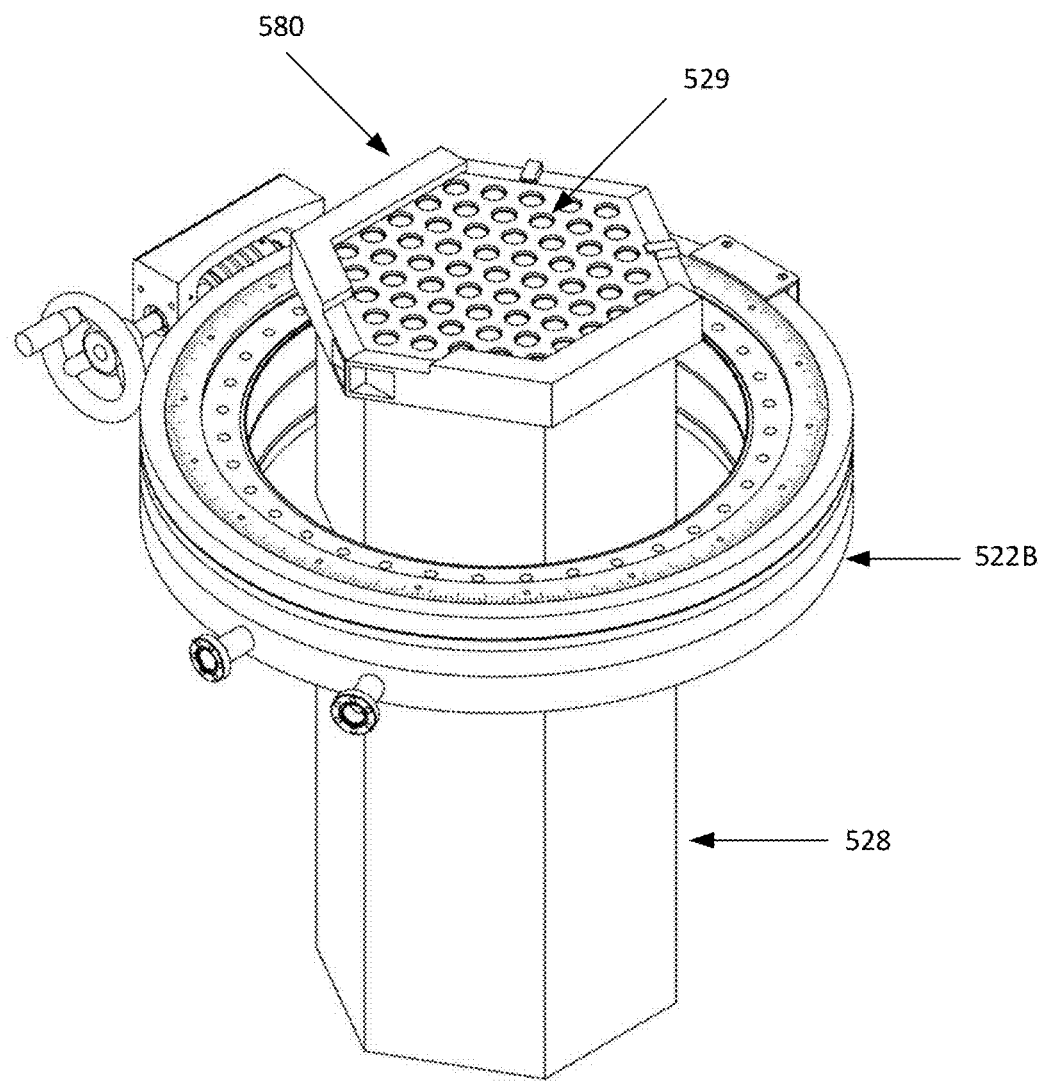
FIG. 11 is a diagram illustrating a plug sheet alignment mechanism used for heat pipe array closure, according to an embodiment of the present invention.

FIG. 11 is a diagram illustrating core block 528 with a lower rotatable flange 522B, according to an embodiment of the present invention. In this embodiment, core block 528 includes heat pipe cavities with a plug sheet guide 580 placed on top to position the plug sheet into heat pipe cavities 529.

FIG. 12 is a diagram illustrating a plug sheet 582 and a plug sheet guide 580, according to an embodiment of the present invention. In this embodiment, plug sheet guide 580 guides plug sheet 582 and allows for a linear motion to insert plugs into heat pipe cavities. Plug sheet 582 is a network of tapered plugs connected to each other by webbing. The webbing holds plug sheet 582 in the same pattern as the heat-pipes cavities. Initially, plug sheet 582 rests on the face of the core block offset from their respective heat-pipe cavities holes so the working fluid tube may lower into the heat-pipe cavities through the gaps in the webbing of plug sheet 582. Once the fill process is complete, a linear actuator fed through a vacuum port moves plug sheet 582 horizontally until plug sheet 582 is aligned with and is dropped into the heat pipe cavities. In some embodiments, magnets may be embedded into the webbing to assist plug sheet 582 positioning with ferritic steel inserts on the monolith face. When dropped into position, the webbing may rest on the smooth monolith face. In an alternative embodiment, a pattern matching the webbing shape milled into the monolith (not shown) allows plug sheet 582 to rest flush with the surface. The shoulder of each plug creates an interface with the core block to permit welding.

Figure 13:
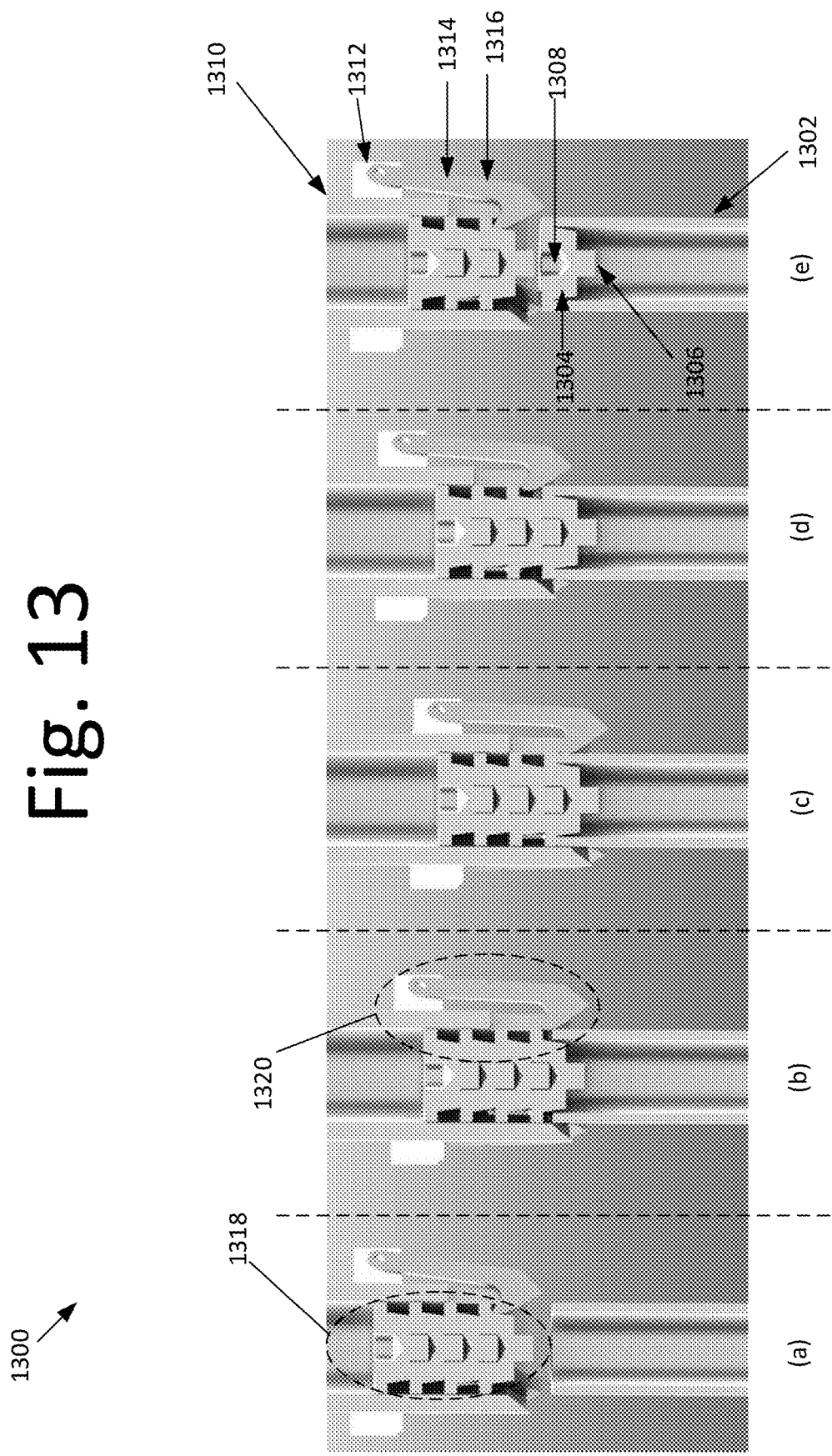
FIG. 13 is a diagram illustrating the action of an alternative plug sheet dispenser mechanism, according to an embodiment of the present invention.

FIG. 13 is an image 1300 illustrating the action (a) to (e) of an alternative plug dispenser mechanism, according to an embodiment of the present invention. The plug dispenser is housed in an enclosure similar to the fill assembly. A cartridge of plugs 1318 is contained in a tube 1310. Each plug 1304 have interlocking features 1306 and 1308 that prevent them from becoming stuck inside 1310. A spring loaded cam deployment mechanism 1320 comprising of mounting block and pin 1312, spring 1314, and cam 1316 allows a single plug 1304 to be dispensed from tube 1310 onto the face of core or tube 1302.

Figure 14B:
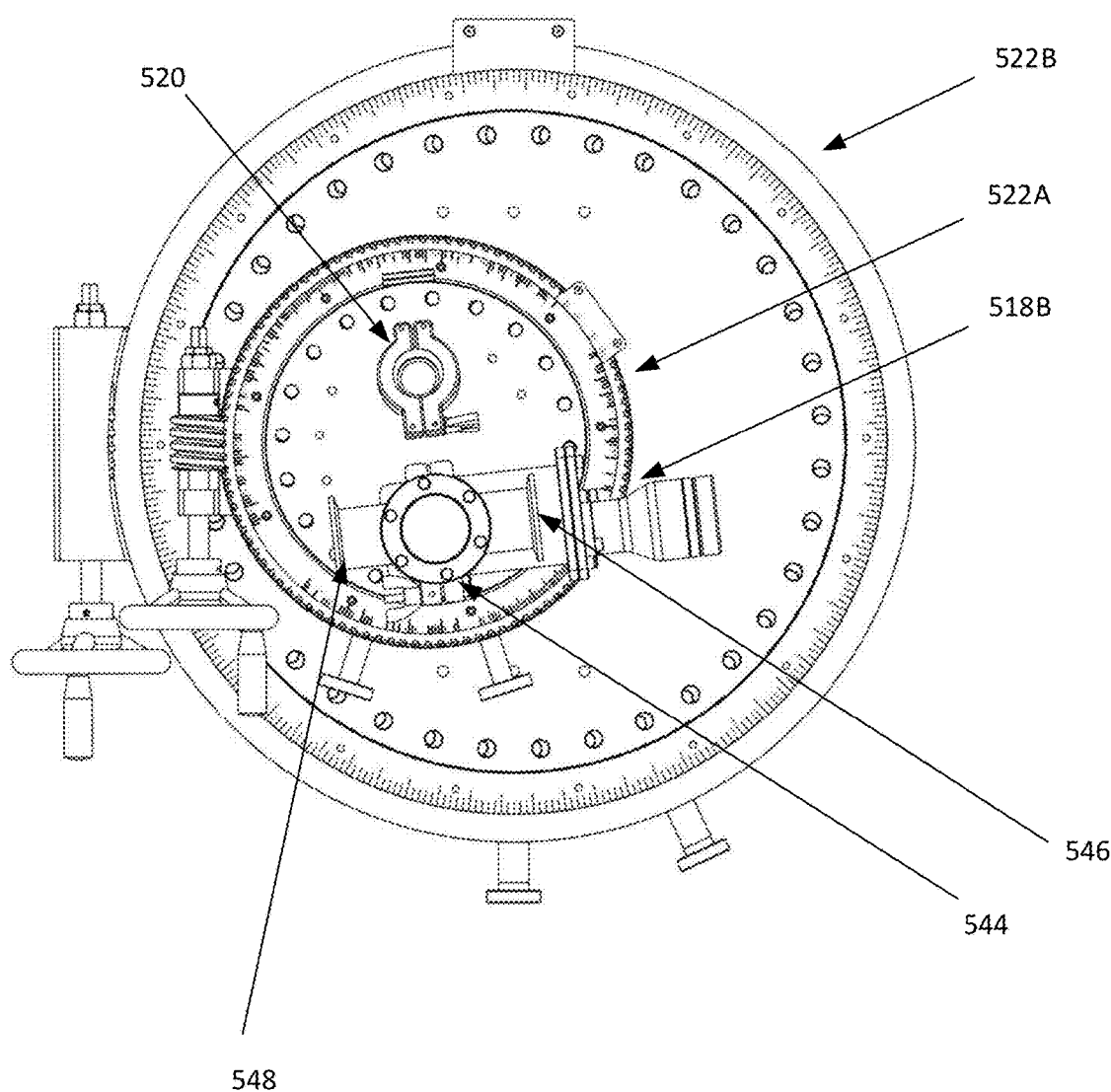
FIG. 14B is a diagram illustrating a top perspective view of a two degree of freedom fill system in the weld configuration, according to an embodiment of the present invention.

FIGS. 14A and 14B are diagrams illustrating the weld configuration 1400 of the eFill system, according to an embodiment of the present invention. In this embodiment, viewport 520 allows observation of the weld process by camera. Rotatable flange 522A moves laser weld window 544 about a single degree of freedom. Rotatable flange 522B moves laser weld window 544 in a second degree of freedom allowing access along the face of core block 528. Gate valve 518B isolates laser transmission assembly 541 from the chamber containing rotatable flanges 522A and 522B. In some embodiments, laser transmission assembly 541 includes a vacuum-cross. The vacuum-cross, for example, connects to main chamber assembly 536 at gate valve 518B on the lower end. A laser weld window 544 connects to the upper end of the cross. The cross also connects to a gas knife supply port 546 on the left side and a gas knife vacuum port 548 on the right side. To align the laser, gate valve 518B is opened and the rotatable flanges 522A, 522B are positioned above the heat-pipe cavity.

Gas knife supply port 546 and gas knife vacuum port 548 allow movement of gas across laser window 544 preventing volatile metal from accumulating on laser window 544 during weld closure. In some embodiments, laser window 544 is removable.

As shown in FIG. 14B, viewport 520 allows observation of the weld process by camera. Rotatable flange 522A moves laser weld window 544 about a single degree of freedom. Rotatable flange 522B moves laser weld window 544 in a second degree of freedom allowing access along the face of core block. Gate valve 518B isolates window weld assembly 544 from the chamber containing rotatable flanges 522A and 522B. Gas knife supply port 546 and gas knife vacuum port 548 allow movement of gas across laser weld window 544 preventing volatile metal from accumulating on laser weld window 544 during weld closure.

Figure 15:
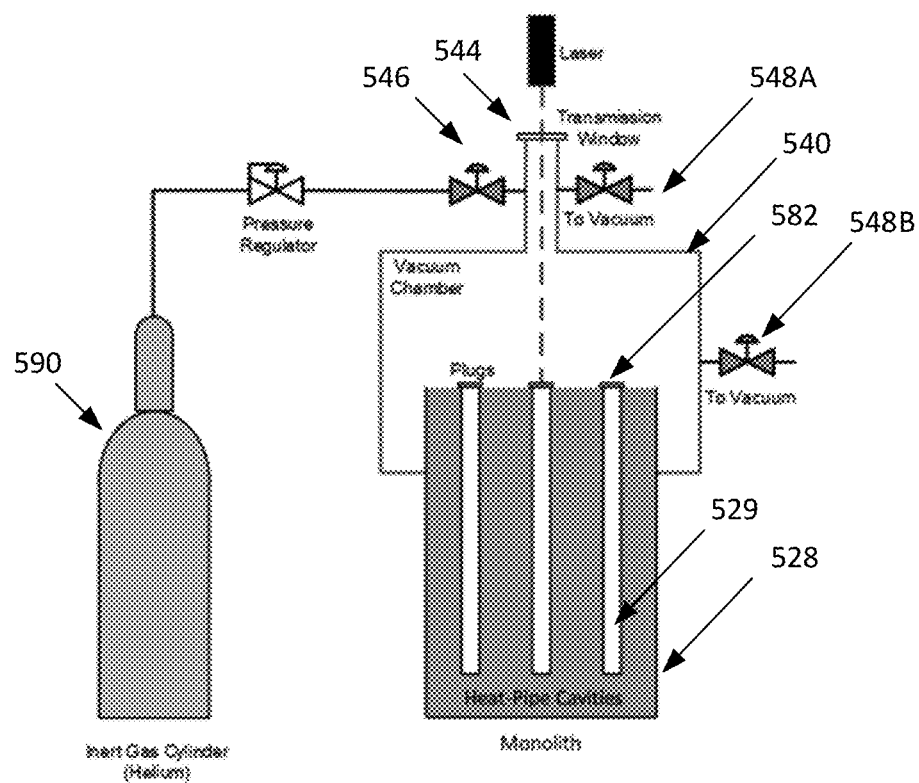
FIG. 15 is a diagram illustrating an elevation view of piping associated with the laser weld configuration, according to an embodiment of the present invention.

FIG. 15 is a diagram illustrating an elevation view of piping associated with the weld configuration 1500 of eFill system, according to an embodiment of the present invention. Gas passes from an inert gas cylinder 590 through a pressure regulator 592 and into a gas knife supply port 546. Two vacuum valves 548A and 548B control vacuum chamber pressure. A laser beam shines through a laser weld window 544 on to the plug that nest in heat pipe cavities 529. The gas knife supply port 546 controls volatiles generated from the welds at heat pipe cavities 529. Laser welding occurs under partial vacuum (≈0.1 mbar helium).

Figure 16A:
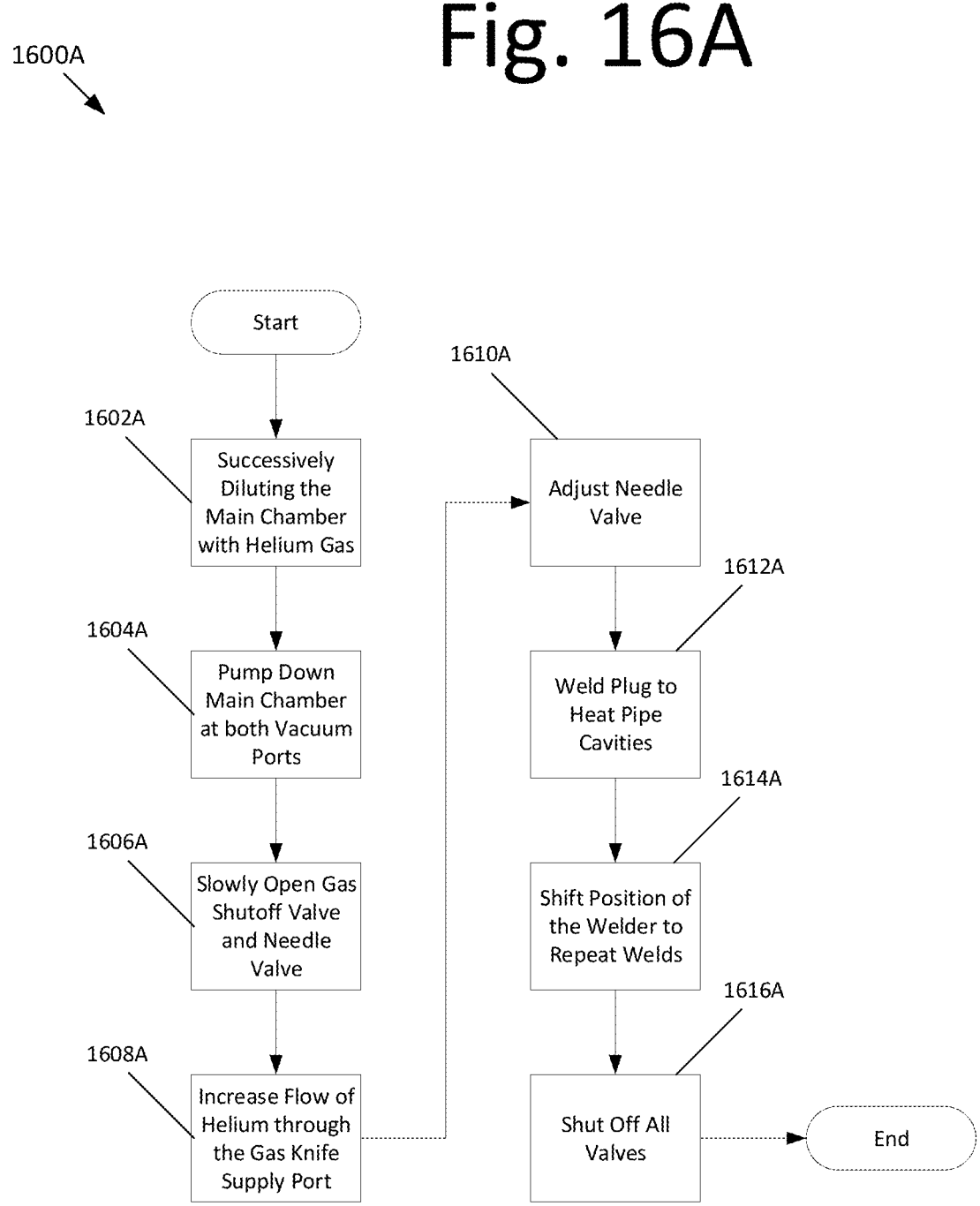
FIG. 16A is a process flow chart showing operating steps for the weld configuration with gas knife, according to an embodiment of the present invention.

FIG. 16A is a flow diagram illustrating a process 1600A for operating the laser with a gas knife supply port, according to an embodiment of the present invention. In some embodiment, process 1600A may begin at 1602A with successively diluting the main chamber with helium gas (e.g., 1 bar to 0.1 mbar) to remove oxygen. At 1604A, the main chamber is pumped down at both vacuum ports with gas shut off valve closed. At 1606A, with two roughing vacuum pumps pulling on the main chamber, the gas shutoff valve and the open needle valve is slowly opened to allow the gas to flow through the gas knife supply port. At 1608A, the flow of helium is increased through the gas knife supply port until the pressure in the main chamber reaches a desired or predefined weld pressure. In some embodiments, a correction chart is used for convection gauges when using helium gas. The gauge may read the same as it would for air, and therefore, the welds must be less than 1 mbar to require no pressure correction.

At 1610A, the needle valve is adjusted when necessary to stabilize the pressure at the targeted pressure. At 1612A, the plug is welded to the heat pipe cavities to close out the heat pipe, and at 1614A, the position of the welder is shifted so the weld may be repeated for the remaining plugs and heat pipe cavities. Finally, at 1616A, the gas knife supply port, and all remaining valves described herein, are shut off prior to disassembling the main chamber.

FIG. 16B is a flow diagram illustrating a process 1600B for operating the laser without a gas knife supply port, according to an embodiment of the present invention. In some embodiment, process 1600B may begin at 1602B with successively diluting the main chamber with helium gas (e.g., 1 bar to 0.1 mbar) to remove oxygen. At 1604B, the main chamber is pumped down at both vacuum ports with gas shut off valve closed.

At 1610B, the needle valve is adjusted when necessary to stabilize the pressure at the targeted pressure. At 1612B, the plug is welded to the heat pipe cavities to close out the heat pipe, and at 1614B, the position of the welder is shifted so the weld may be repeated for the remaining plugs and heat pipe cavities. Finally, at 1616B, the gas knife supply port, and all remaining valves described herein, are shut off prior to disassembling the main chamber.

Weld Inspection

Stainless steel 316, which contains manganese, can volatize at weld temperatures and can lead to laser weld window fogging. To resolve this issue, certain embodiments utilize maraging steel. Maraging steel does not include significant manganese and does not lead to manganese volatizing at laser weld window.

Figure 17:
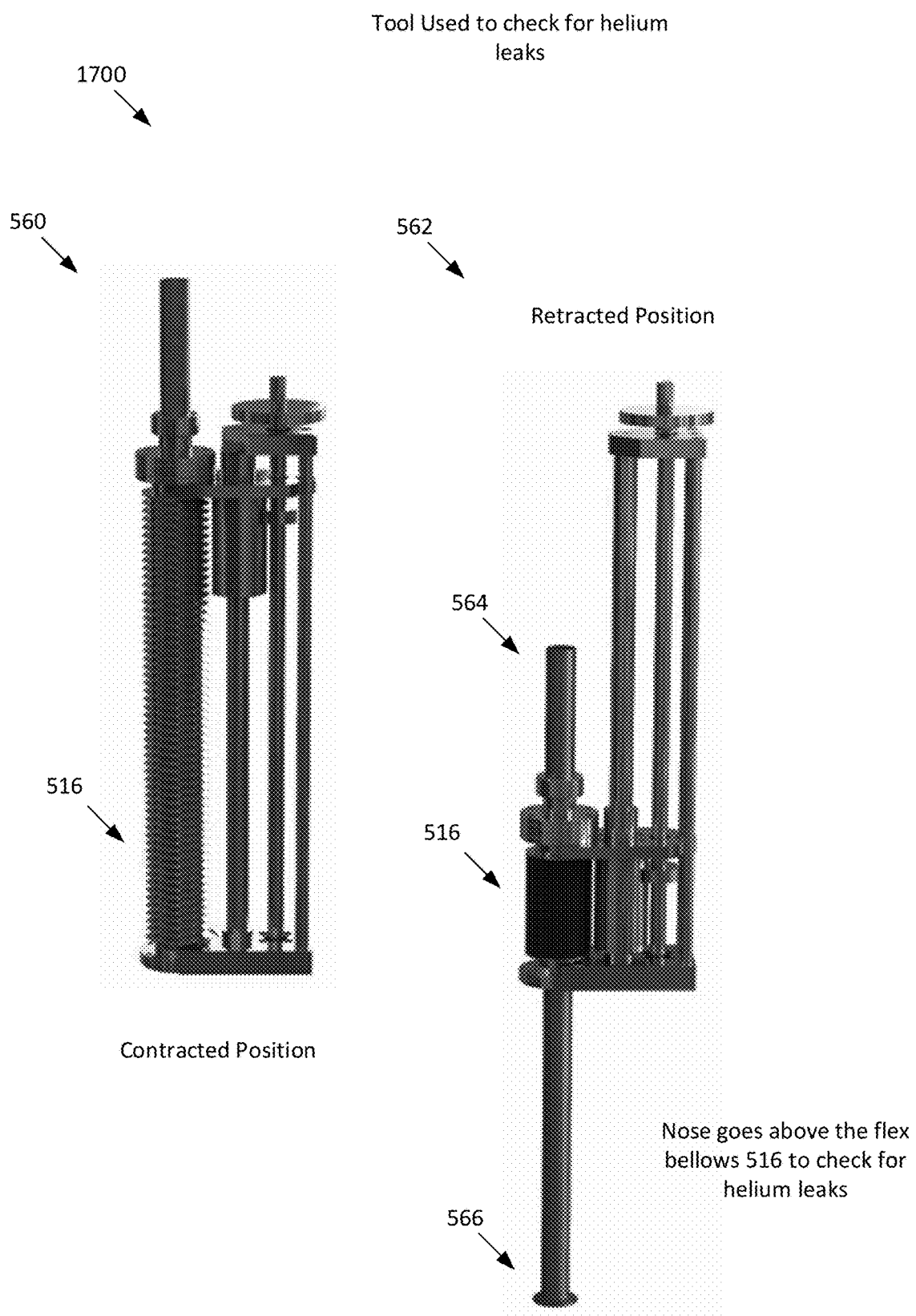
FIG. 17 is a diagram illustrating a perspective view of a tool used to check for helium leaks, according to an embodiment of the present invention.

FIG. 17 is a diagram illustrating a perspective view of a leak detection tool 1700 used to detect helium leaks, according to an embodiment of the present invention. Tool 1700 include a tube 560 and flex bellows 516, allowing tube 560 to be in a contracted position. Tube 560 may also be in a retracted position. At one end of tube 560 is a leak detector port 564 connected to a helium leak detector (not shown). The other end tube 560 is a sniffer nose 566 that seals tube 560 to the face of heat pipe cavity (not shown), so welding leaks can be checked between the heat pipe plug (not shown) and the heat pipe cavity (not shown).

It will be readily understood that the components of various embodiments of the present invention, as generally described and illustrated in the figures herein, may be arranged and designed in a wide variety of different configurations. Thus, the detailed description of the embodiments, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. An apparatus for filling a plurality of heat pipes, the apparatus comprising:
 a working fluid assembly configured to fill the plurality of heat pipes sequentially or simultaneously with a known quantity of working fluid;
 a pair of rotatable flanges in a stacked arrangement having a radius of R1 and R2, respectively, rotating in an angle $\theta_1$ and $\theta_2$, respectively, wherein a first one of the pair of rotatable flanges allow the working fluid assembly to move with the second one of rotatable flanges to position a working fluid tube over the plurality of heat pipes; and
 a main chamber assembly configured to isolate the working fluid from atmosphere surrounding the apparatus, thereby providing a controlled atmosphere, the controlled atmosphere being vacuum or inert gas.

2. The apparatus of claim 1, further comprising:
 a pair of isolating vacuum-rated gate valves separating the main chamber assembly from the working fluid assembly, wherein
 a first one of the pair of isolating vacuum-rated gate valves is configured to isolate the main chamber assembly, and
 a second one of the pair of isolating vacuum-rated gate valves is configured to isolate the working fluid assembly.

3. The apparatus of claim 1, further comprising:
 a core block comprising the plurality of heat pipes resting below the first one of the pair of rotatable flanges, wherein
 a theta-theta position of the pair of rotatable flanges are defined in Cartesian coordinates (x, y) as follows $$x = R_1 \cos \theta_1 + R_2 \cos \theta_2$$

$$y = R_1 \sin \theta_1 + R_2 \sin \theta_2$$

wherein subscript 1 represents a motion of the first one of the pair of rotatable flanges and subscript 2 represents a motion of the second one of the pair of rotatable flanges.

4. The apparatus of claim 1, further comprising:
a lifting column configured to raise the working fluid assembly contained in flex bellows from a level of a core block above gate valves, allowing for vacuum isolation of the working fluid assembly from the atmosphere surrounding the apparatus.

5. The apparatus of claim 4, wherein the lifting column is further configured to lower the working fluid assembly contained in the flex bellows from a level of vacuum isolation valves to the level of the core block, allowing the working fluid to be dispensed into the plurality of heat pipes.

6. The apparatus of claim 1, further comprising:
a metering manifold configured to dispense the known quantity of working fluid into the plurality of heat pipes, wherein
the metering manifold comprises a cylinder, a plurality of valves, and a ball,
the cylinder contains the known quantity of working fluid and the ball, and
the plurality of valves comprises a first set of valves and a second set of valves,
the first set of valves, when opened, moves the known quantity of working fluid forcing the ball across the cylinder, causing a fixed quantity of working fluid ahead of the ball through one of the valves in the first set of valves, allowing the fixed quantity of working fluid to pass out from the metering manifold, and
the second set of valves, when opened, moves the known quantity of working fluid forcing the ball across in an opposite direction in the cylinder, causing the fixed quantity of working fluid ahead of the ball through one of the valves in the second set of valves, allowing the fixed quantity of working fluid to pass out from the metering manifold.

7. The apparatus of claim 1, further comprising:
a core block comprising the plurality of heat pipes with a plug sheet guide placed on top of the plurality of heat pipes, wherein
the plug sheet guide is configured to guide a plug sheet, allowing for a linear motion to insert a plurality of plugs into the plurality of heat pipes, and
the plug sheet is a network of a plurality of tapered plugs connected to each other by webbing.

8. The apparatus of claim 1, further comprising:
a cartridge of plugs contained in a tube, wherein
each plug in the cartridge of plugs comprises an interlocking mechanism preventing the plug from being stuck inside the tube.

9. The apparatus of claim 8, further comprising:
a spring loaded cam deployment mechanism comprising a mounting block and pin, a spring, and a cam allowing the plug to be dispensed from the tube onto a face of the tube.

10. The apparatus of claim 1, further comprising:
a laser welder located outside of a chamber configured to weld a plurality of plugs to the plurality of heat pipes to seal each of the plurality of heat pipes after each of the plurality of plugs are installed, wherein
the laser welder is configured to generate a laser beam that passes through a laser transmission window and through an atmosphere of the chamber to fuse each of the plurality of plugs to the plurality of heat pipes.

11. The apparatus of claim 10, wherein the chamber is filled with helium gas at a predefined pressure after the plurality of heat pipes are filled.

12. The apparatus of claim 11, further comprising:
a helium leak detector configured to detect a leak from any void or imperfections of the laser weld.

13. An apparatus for filling a plurality of heat pipes, the apparatus comprising:
a metering manifold configured to dispense a known quantity of working fluid into the plurality of heat pipes depending on a translational movement of a ball inside of the metering manifold and an opening of a plurality of valves;
a working fluid assembly configured to fill the plurality of heat pipes sequentially or simultaneously with the known quantity of working fluid; and
a main chamber assembly configured to isolate the working fluid from atmosphere surrounding the apparatus, thereby providing a controlled atmosphere, the controlled atmosphere being vacuum or inert gas.

14. The apparatus of claim 13, further comprising:
a laser weld window configured to be movable about a single degree of freedom by a first one of a plurality of rotatable flanges.

15. The apparatus of claim 14, wherein the laser weld window is further configured to be movable about a second degree of freedom by a second one of a plurality of rotatable flanges.

16. The apparatus of claim 14, wherein the laser weld window connects to an upper end of a cross, the cross connecting to a gas knife supply port on a first side and a gas knife vacuum port on a second side.

17. The apparatus of claim 16, further comprising:
a gas knife comprising the gas knife supply port and the gas knife vacuum port, wherein
the gas knife supply port and the gas knife vacuum port are configured to facilitate movement of gas across the laser weld window preventing volatile metal from accumulating on the laser weld window during weld closure.

18. The apparatus of claim 13, wherein the plurality of heat pipes are applied to nuclear reactors.

19. The apparatus of claim 13, wherein the working fluid comprises one or more alkali metals.

* * * * *